United States Patent
Dai et al.

(10) Patent No.: US 11,121,400 B2
(45) Date of Patent: Sep. 14, 2021

(54) ELECTROLYTES, CURRENT COLLECTORS, AND BINDERS FOR RECHARGEABLE METAL-ION BATTERIES

(71) Applicant: The Board of Trustees of the Leland Stanford Junior University, Stanford, CA (US)

(72) Inventors: Hongjie Dai, Stanford, CA (US); Michael R. Angell, Stanford, CA (US); Yingpeng Wu, Stanford, CA (US); Ming Gong, Stanford, CA (US); Chunze Yuan, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 77 days.

(21) Appl. No.: 15/781,099

(22) PCT Filed: Dec. 14, 2016

(86) PCT No.: PCT/US2016/066644
§ 371 (c)(1),
(2) Date: Jun. 1, 2018

(87) PCT Pub. No.: WO2017/106337
PCT Pub. Date: Jun. 22, 2017

(65) Prior Publication Data
US 2019/0006701 A1    Jan. 3, 2019

Related U.S. Application Data

(60) Provisional application No. 62/267,429, filed on Dec. 15, 2015.

(51) Int. Cl.
*H01M 4/02* (2006.01)
*H01M 10/054* (2010.01)
(Continued)

(52) U.S. Cl.
CPC .......... *H01M 10/054* (2013.01); *H01M 4/38* (2013.01); *H01M 4/587* (2013.01); *H01M 4/622* (2013.01);
(Continued)

(58) Field of Classification Search
CPC ....................................................... H01M 4/02
See application file for complete search history.

(56) References Cited

U.S. PATENT DOCUMENTS

| | | | |
|---|---|---|---|
| 2003/0165743 A1 | 9/2003 | Horikiri et al. | |
| 2004/0097755 A1* | 5/2004 | Abbott | B01J 31/006 562/553 |

(Continued)

FOREIGN PATENT DOCUMENTS

| | | |
|---|---|---|
| JP | 59-36572 U | 3/1984 |
| JP | 63-264878 A | 11/1988 |

(Continued)

OTHER PUBLICATIONS

"The rechargeable aluminum-ion battery" Chem. Commun., 2011, 47, 12610-12612 Jayaprakash et al 2011.*

(Continued)

*Primary Examiner* — Jacob B Marks
(74) *Attorney, Agent, or Firm* — Foley & Lardner LLP

(57) ABSTRACT

A metal-ion battery includes: 1) an anode including a metal; 2) a cathode; and 3) an ionic liquid electrolyte disposed between the anode and the cathode, wherein the ionic liquid electrolyte corresponds to a mixture of a metal halide and an organic compound.

22 Claims, 14 Drawing Sheets

(51) Int. Cl.
| | |
|---|---|
| *H01M 4/38* | (2006.01) |
| *H01M 4/587* | (2010.01) |
| *H01M 4/62* | (2006.01) |
| *H01M 4/66* | (2006.01) |
| *H01M 10/0569* | (2010.01) |
| *H01M 50/44* | (2021.01) |
| *H01M 50/431* | (2021.01) |
| *H01M 4/134* | (2010.01) |

(52) U.S. Cl.
CPC ....... *H01M 4/663* (2013.01); *H01M 10/0569* (2013.01); *H01M 50/431* (2021.01); *H01M 50/44* (2021.01); *H01M 4/134* (2013.01); *H01M 2300/0022* (2013.01); *H01M 2300/0045* (2013.01)

(56) References Cited

U.S. PATENT DOCUMENTS

| | | | |
|---|---|---|---|
| 2010/0062339 A1 | 3/2010 | Pan et al. | |
| 2011/0052998 A1* | 3/2011 | Liang | H01M 4/136 429/300 |
| 2012/0082905 A1 | 4/2012 | Brown et al. | |
| 2013/0228718 A1* | 9/2013 | Lee | H01M 4/131 252/182.1 |
| 2013/0302697 A1* | 11/2013 | Wang | B82Y 30/00 429/300 |
| 2015/0214549 A1* | 7/2015 | Suto | H01M 10/054 429/200 |
| 2015/0249261 A1 | 9/2015 | Dai et al. | |

FOREIGN PATENT DOCUMENTS

| | | |
|---|---|---|
| JP | 458467 A | 2/1992 |
| JP | 2008-517749 A | 5/2008 |
| JP | 2010-118258 A | 5/2010 |
| JP | 2012-243416 A | 12/2012 |
| JP | 2013-196978 A | 9/2013 |
| JP | 2013-538413 A | 10/2013 |
| JP | 2014-041996 A | 3/2014 |
| JP | 2015-095364 A | 5/2015 |
| JP | 2018-514850 A | 6/2018 |
| RU | 2479077 C2 | 4/2013 |
| WO | WO-2007/055172 A1 | 5/2007 |
| WO | WO-2010/126648 A1 | 11/2010 |
| WO | WO-2015/131132 A1 | 9/2015 |

OTHER PUBLICATIONS

International Preliminary Report on Patentability issued in PCT/US2016/066644 dated Jun. 28, 2018, 12 pages.
Li Min et al., "Electrodeposition behavior of aluminum from urea-acetamide-lithium halide low-temperature molten salts", Electrochimica Acta, Elsevier Science Publishers, Barking, GB, vol. 185, Oct. 26, 2015, pp. 148-155.
Partial Supplementary European Search Report issued in EP 16876582.4 dated Jul. 11, 2019, 16 pages.
Official Action and Search Report on RU Application No. 2018119770 dated Mar. 12, 2020, 11 pages (English Translation).
Abood, H.M.A. et al. (2011) "Do all ionic liquids need organic cations? Characterisation of [AlCl2-nAmide]+ AlCl4− and comparison with imidazolium based systems," Chemical Communications 47(12):3523-3525.
Angell, M. et al. (2016) "A High Efficiency Aluminum-Ion Battery Using an AlCl(3)-Urea Ionic Liquid Analogue Electrolyte," Cornell University Library, arXiv:1611.09951.
Fang, Y. et al. (2015) "An AlCl3 Based Ionic Liquid with a Neutral Substituted Pyridine Ligand for Electrochemical Deposition of Aluminum," Electrochim Acta 160:82-88.
Fang, Y. et al. (2015) "New Ionic Liquids Based on the Complexation of Dipropyl Sulfide and AlCl3 for Electrodeposition of Aluminum," Chemical Communications 51(68):13286-13289.
Hogg, J.M. et al. (2015) "Liquid Coordination Complexes: A New Class of Lewis Acids as Safe Alternatives to BF3 in Synthesis of Polyalphaolefins," Green Chem 17(3):1831-1841.
Lin, M. et al. (2015) "An Ultrafast Rechargeable Aluminium-ion Battery," Nature 520(7547):325-328.
Pulletikurthi, G. et al. (2015) "Electrodeposition of Al from a 1-butylpyrrolidine-AlCl3 Ionic Liquid," Progress in Natural Science-Materials International 25(6):603-611.
Wu, Y. et al. (2016) "3D Graphitic Foams Derived from Chloroaluminate Anion Intercalation for Ultrafast Aluminum-Ion Battery," Adv Mater 28(41):9218-9222.
International Search Report and Written Opinion (ISA/KR) for International Application No. PCT/US2016/066644, dated Apr. 5, 2017.
First Examination Report for IN 201837004884 dated Jun. 29, 2020.
Foreign Action other than Search Report on CN 2016800586320 dated Dec. 3, 2020.
Masafumi Arakawa, Ryudosokuteinyumon (introduction to particle size measurement), Journal of the Society of Powder Technology, Japan, Japan, Jun. 10, 1980, vol. 17, No. 6, pp. 299-307.

* cited by examiner

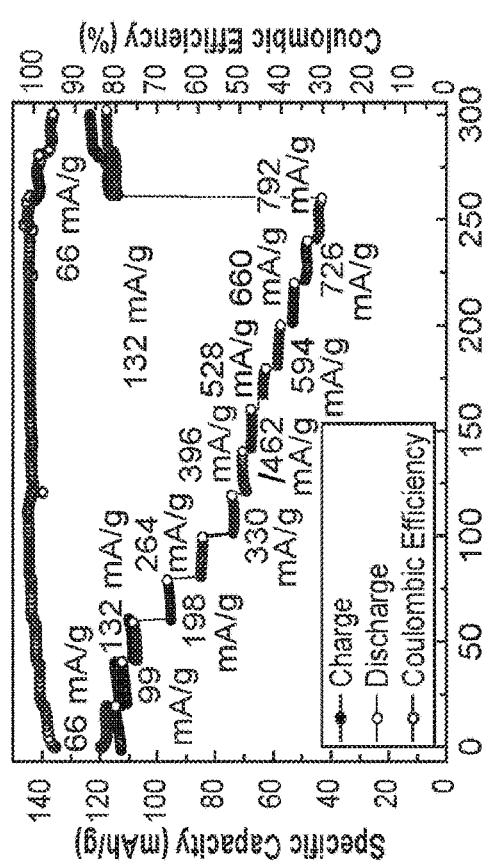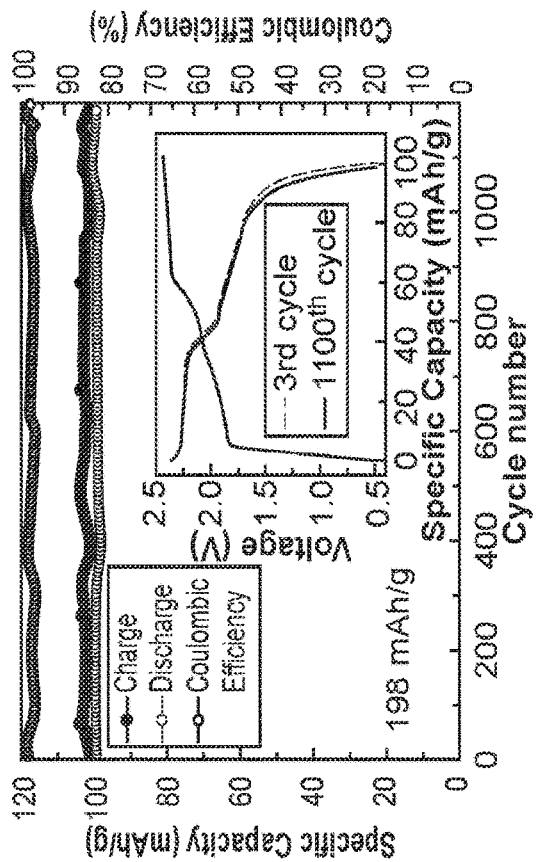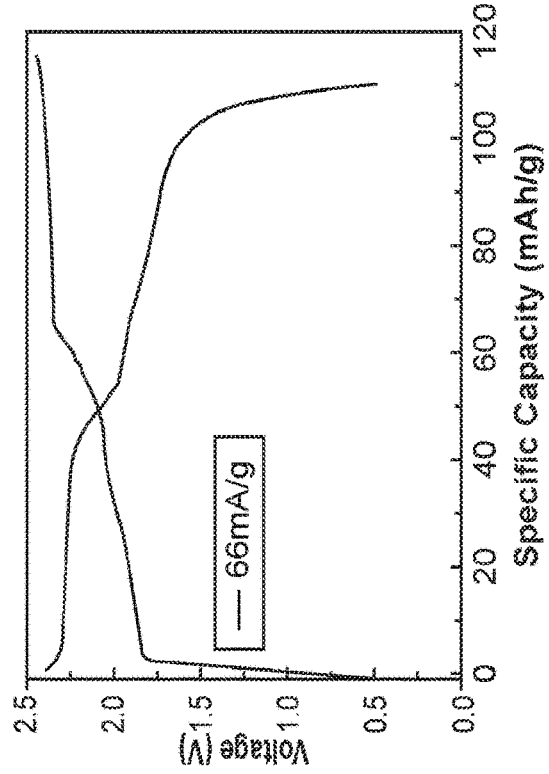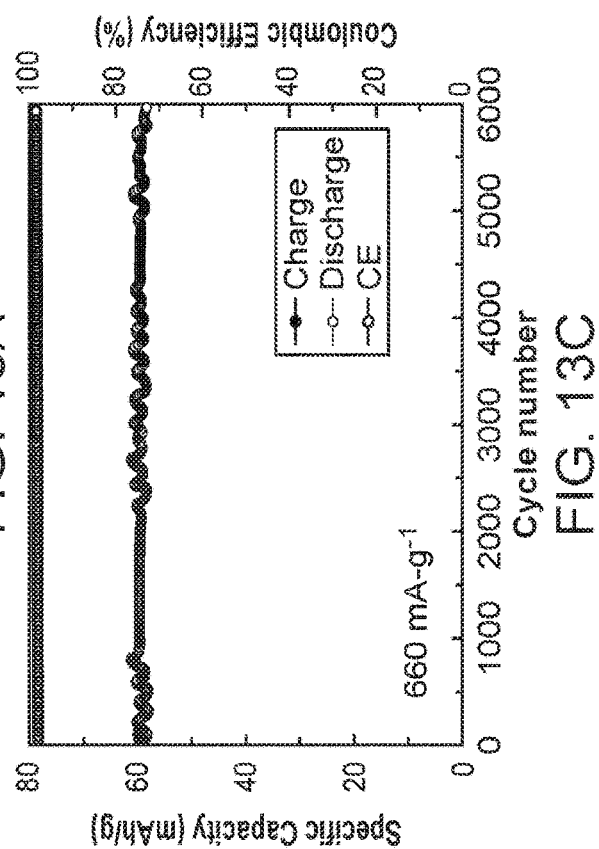
FIG. 13A
FIG. 13B
FIG. 13C
FIG. 13D

ELECTROLYTES, CURRENT COLLECTORS, AND BINDERS FOR RECHARGEABLE METAL-ION BATTERIES

CROSS-REFERENCE TO RELATED APPLICATION

This application is a national stage entry under 35 U.S.C. § 371 of International Application No. PCT/US2016/066644, filed Dec. 14, 2016, which claims the benefit of U.S. Provisional Application No. 62/267,429, filed Dec. 15, 2015, the content of which is incorporated herein by reference in its entirety.

STATEMENT REGARDING FEDERALLY SPONSORED RESEARCH OR DEVELOPMENT

This invention was made with Government support under contact DE-SC0008684 awarded by the Department of Energy. The Government has certain rights in the invention.

BACKGROUND

Due to the high natural abundance and three electron redox properties of aluminum, aluminum-ion batteries present a desirable option for large-scale storage of renewable energy. However, aluminum-ion batteries face several challenges, which are addressed by embodiments of this disclosure.

It is against this background that a need arose to develop embodiments of this disclosure.

SUMMARY

In some embodiments, improved aluminum (Al)-ion battery electrolytes as alternatives to an 1-ethyl-3-methylimidazolium (EMI)-based electrolyte are developed with the benefits of including a cationic electroactive species for aluminum deposition during charging and lowering the cost of the electrolytes. Ionic liquids include, or are formed from, a mixture of aluminum chloride ($AlCl_3$) and a ligand (ligand=urea, acetamide, or 4-propylpyridine). $AlCl_3$ undergoes asymmetric cleavage to form a tetrachloroaluminate anion ($AlCl_4^-$) and an aluminum chloride cation ($AlCl_2^+$) in which a ligand is datively bonded to (or associated through coordination via sharing of lone pair electrons) the $AlCl_2^+$ cation, forming ($[AlCl_2.n(ligand)]^+$), and the resulting ionic liquids are used as electrolytes for Al-ion batteries. The urea-based ionic liquid electrolyte is a particularly successful electrolyte system, affording Al-ion batteries with voltage profiles similar to the $AlCl_3$/1-ethyl-3-methylimidazolium chloride (EMIC)-based electrolyte. With the urea-based electrolyte, the theoretical energy density of the battery is increased from about 64 Wh/kg (in the EMIC-based system) to at least about 71 Wh/kg, owing to a smaller molecular weight of urea and the number of aluminum-based ions involved in aluminum deposition during charging of the battery. This system yields discharge plateaus at about 1.75 V and a specific capacity of at least about 76-78 mAh/g, and coulombic efficiencies of at least about 99%. Other improved electrolytes are developed including trimethylphenylammonium chloride/$AlCl_3$ mixtures. These improved electrolytes are desirable for the development of higher temperature batteries (e.g., about 20° C.-70° C.), owing to the increased thermal stability of the trimethylphenylammonium cation. Furthermore, a method of electrolyte purification to remove water/HCl is described to suppress side reactions and prolong battery cycle life. Also, improved current collectors for graphite cathodes of Al-ion batteries are developed to alleviate corrosion problems of metal substrates in $AlCl_3$-based ionic liquids. Corrosion-resistant current collectors are developed to allow for long cycling abilities, and, the corrosion-resistant current collectors are flexible, thus allowing for fabrication of flexible batteries. Moreover, improved polymer binders for graphitic particles (e.g., nanoparticles) are developed for cathodes of Al-ion batteries.

Aluminum-ion batteries of some embodiments of this disclosure can be inexpensive and can have a high rate capability, can allow battery operations over a wide temperature range of about −40° C. to about 70° C., and can be beneficial in applications in renewable energy storage (grid-scale storage or home backup battery). Also, applications involving batteries operating at voltages at about 1.75 V, including portable electronic devices, or hybrid electric vehicles (which typically use nickel metal hydride batteries due to their long cycle lives) can benefit from the use of the batteries of some embodiments. Furthermore, corrosion-resistant current collectors and cathode materials of some embodiments can be flexible and allow for the fabrication of flexible batteries and wearable electronic devices.

In some embodiments, a metal-ion battery includes: 1) an anode including a metal; 2) a cathode, and 3) an ionic liquid electrolyte disposed between the anode and the cathode, wherein the ionic liquid electrolyte corresponds to a mixture of a metal halide and an organic compound.

In some embodiments, a battery operation temperature is about −40° C. to about 70° C., or about −30° C. to about 60° C.

In some embodiments, the metal is aluminum, and the metal halide is an aluminum halide.

In some embodiments, the aluminum halide is $AlCl_3$, and the organic compound is an amide. In some embodiments, the amide is urea. In some embodiments, a molar ratio of $AlCl_3$:urea in the mixture is in a range of about 1.1 to about 1.7.

In some embodiments, the aluminum halide is $AlCl_3$, and the organic compound includes cations selected from N-(n-butyl) pyridinium, benzyltrimethylammonium, 1,2-dimethyl-3-propylimidazolium, trihexyltetradecylphosphonium, and 1-butyl-1-methyl-pyrrolidinium, and anions selected from tetrafluoroborate, tri-fluoromethanesulfonate, and bis(trifluoromethanesulfonyl)imide.

In some embodiments, the aluminum halide is $AlCl_3$, and the organic compound is selected from 4-propylpyridine, acetamide, trimethylphenylammonium chloride, and 1-ethyl-3-methylimidazolium chloride.

In some embodiments, the ionic liquid electrolyte includes an aluminum halide cation that is datively bonded to the organic compound.

In some embodiments, the cathode includes a hydrophilic polymer binder and a cathode active material blended with the hydrophilic polymer binder.

In some embodiments, the cathode active material is selected from graphite particles, natural graphite flakes, sulfur particles, selenium particles, black phosphorous particles, and black phosphorous films.

In some embodiments, the cathode active material includes natural graphite flakes having no or very low defect density or low D Raman band, relative to the graphitic G band and having sizes, or having at least one dimension, in a range of about 1 μm to about 500 μm, about 10 μm to about 400 μm, or about 20 μm to about 300 μm.

In some embodiments, the hydrophilic polymer binder includes one or more polymers selected from polyacrylic acid, polyvinyl alcohol, cellulose, cellulose derivatives, alginate, styrene-butadiene rubber, poly(3,4-ethylenedioxythiophene), and polystyrene sulfonate.

In some embodiments, the cathode includes a metal substrate as a current collector, and the metal substrate is optionally applied with a protective coating.

In some embodiments, the metal substrate is a nickel substrate, and the protective coating is a coating of a carbonaceous material derived from pyrolysis of organic compounds deposited on the metal substrate from solution or gas phase, or a conducting polymer deposited on the metal substrate, or tungsten deposited on the metal substrate.

In some embodiments, the metal substrate is a tungsten substrate.

In some embodiments, the cathode includes a fibrous, carbonaceous substrate as a current collector. In some embodiments, the fibrous, carbonaceous substrate is carbon fiber paper, carbon fiber cloth, graphite fiber paper, or graphite fiber cloth.

In some embodiments, a method of manufacturing a metal-ion battery includes: 1) providing an anode including aluminum; 2) providing a cathode; and 3) providing an ionic liquid electrolyte, wherein providing the ionic liquid electrolyte includes: a) combining an aluminum halide and an organic compound to form an ionic liquid; and b) adding aluminum in the ionic liquid to react with water and other products resulting from water-related side reaction, and subjecting the ionic liquid to vacuum for about 0.2 h to about 24 h to remove residual water, hydrochloric acid or organic impurities.

In some embodiments, the vacuum is about 0.1 Torr or less.

In some embodiments, providing the ionic liquid electrolyte further includes subjecting the organic compound to heating in vacuum to about 60° C. to about 110° C., or about 70° C. to about 110° C., to remove water prior to combining with the aluminum halide slowly under stirring with cooling to maintain a temperature of about room temperature.

In some embodiments, the aluminum halide is $AlCl_3$, and the organic compound is an amide. In some embodiments, the amide is urea. In some embodiments, a molar ratio of $AlCl_3$:urea is in a range of about 1.1 to about 1.7.

In some embodiments, the aluminum halide is $AlCl_3$, and the organic compound includes cations selected from N-(n-butyl) pyridinium, benzyltrimethylammonium, 1,2-dimethyl-3-propylimidazolium, trihexyltetradecylphosphonium, and 1-butyl-1-methyl-pyrrolidinium, and anions selected from tetrafluoroborate, tri-fluoromethanesulfonate, and bis(trifluoromethanesulfonyl)imide.

In some embodiments, the aluminum halide is $AlCl_3$, and the organic compound is selected from 4-propylpyridine, acetamide, trimethylphenylammonium chloride, and 1-ethyl-3-methylimidazolium chloride.

In some embodiments, the method further includes providing, between the anode and the cathode, a separator selected from a porous membrane, such as a porous glass fiber paper, a regenerated cellulose membrane, a polyester membrane or a polyethersulfone membrane, or other hydrophobic membrane, such as polyethylene membrane, wherein the porous membrane is optionally coated with a hydrophilic polymer such as polyacrylic acid and polyvinyl alcohol, and which is cross-linked by heating. In some embodiments, the separator is a porous glass fiber paper, and a thickness of the porous glass fiber paper is in a range of about 20 μm to about 300 μm.

In some embodiments, providing the ionic liquid electrolyte further includes vacuum pumping the ionic liquid electrolyte to further remove water and hydrochloric acid prior to vacuum sealing a battery stack in a container or pouch.

In some embodiments, the method further includes sealing a container or pouch with a carbon-based current collector glued to metal tabs extending outside the container or pouch for electrical wiring.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

Figure 9:
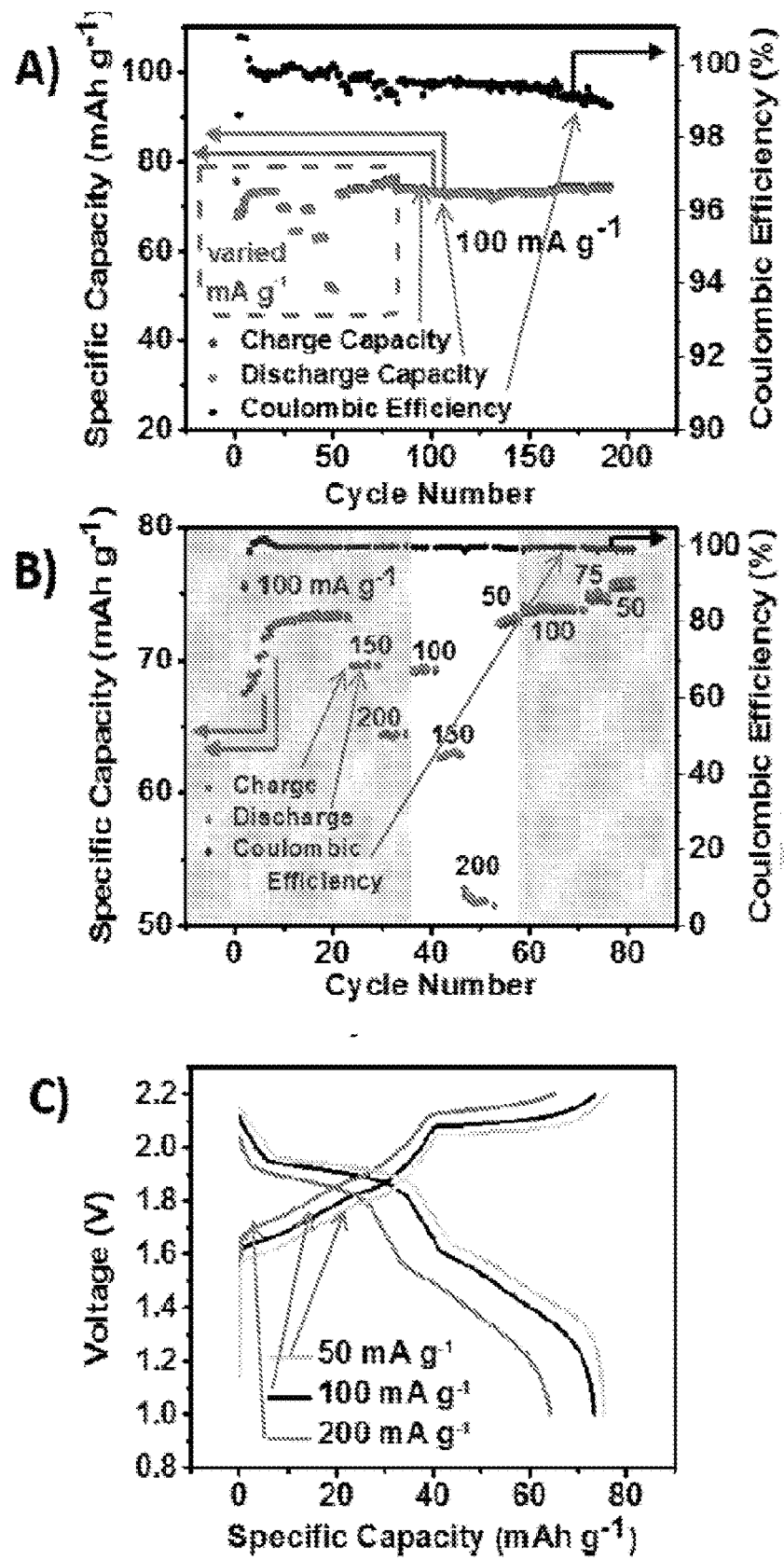

FIG. 9: Characteristics of an Al ion battery in urea/AlCl$_3$=about 1.3 electrolyte. A) Stability test (after charge-discharge rate variation) for about 180 cycles (specific current of about 100 mA g$^{-1}$ and about 2.2 V/about 1 V upper/lower cutoff); B) boxed region of A) (cycles 1-80) with varied charge/discharge rate. Region shaded depicts about 2.2 V upper cutoff, and lighter region depicts about 2.15 V upper cutoff. Lower cutoff is about 1 V for both regions. C) Galvanostatic charge-discharge curves for about 50, about 100, and about 200 mA g$^{-1}$, about 2.2 V/about 1 V upper/lower cutoff.

FIG. 10: In-situ Raman spectra of a graphite electrode recorded during A) charge and C) discharge at about 50 mA g$^{-1}$. Insets zoom in on lower voltage spectra corresponding to graphite G-band E$_{2g}$→E$_{2g(t)}$+E$_{2g(b)}$ splitting. The bottom spectrum in each corresponds to OCV=about 1 V, G-band=about 1584 cm$^{-1}$. Upper spectra (corresponding to upper plateau on charge-discharge curves) represent stage 2 GIC formation/deformation. B) About 50 mA g$^{-1}$ galvanostatic charging curve, coordinated with Raman spectra in A). D) About 50 mA g$^{-1}$ galvanostatic discharging curve, coordinated with Raman spectra in C).

Figure 11:
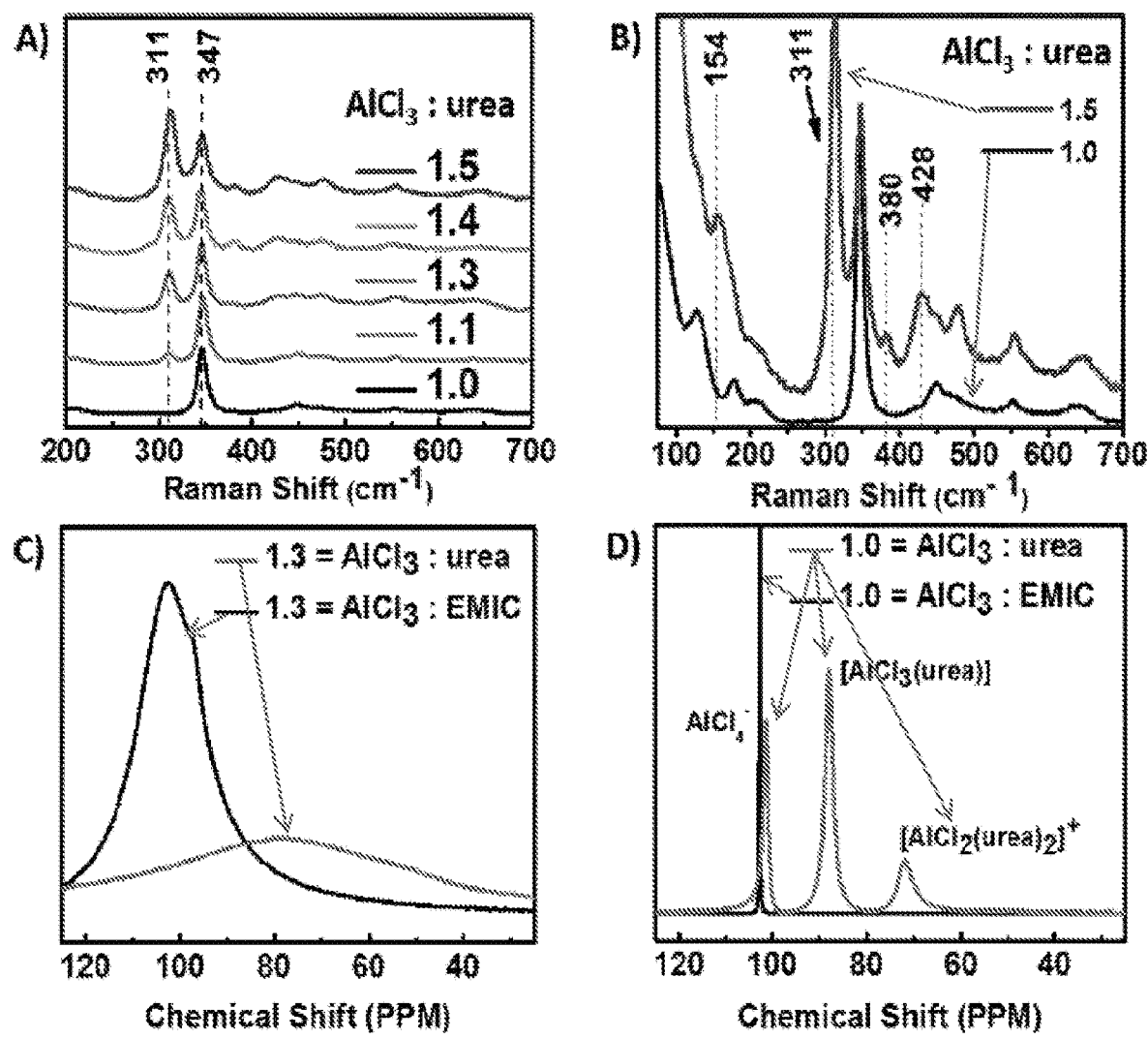
Figure 12A:
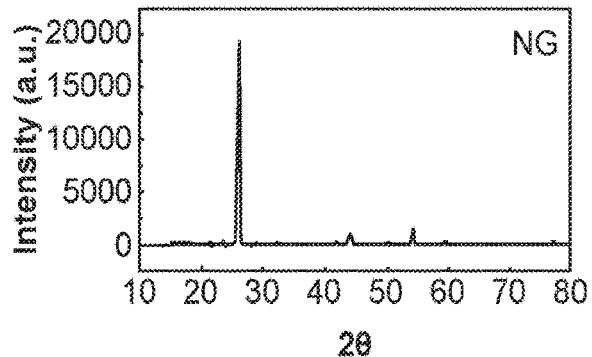
Figure 12B:
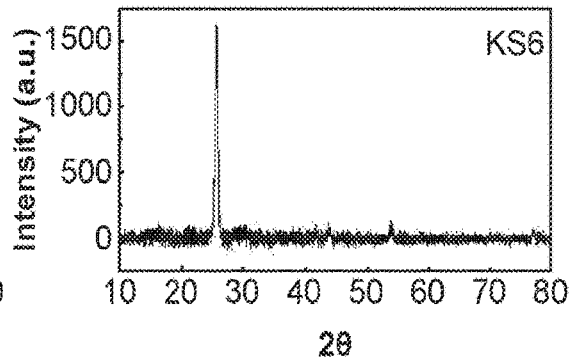
Figure 12C:
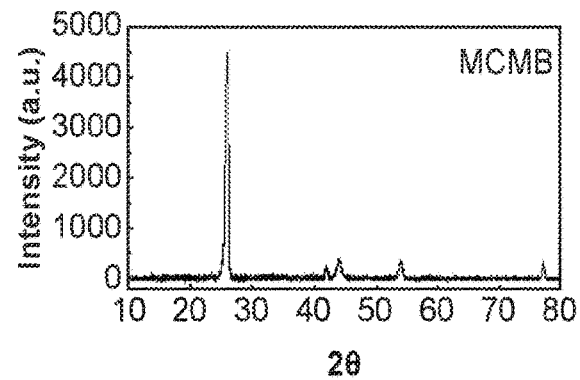
Figure 12D:
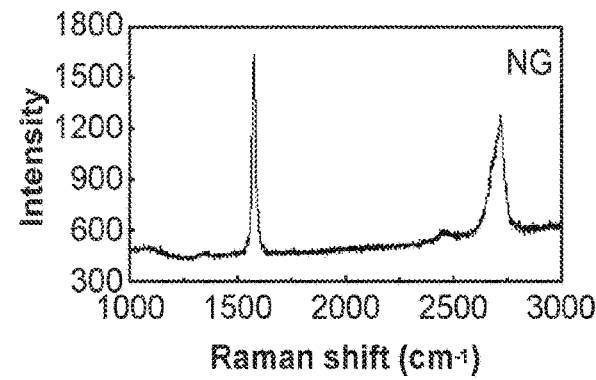
Figure 12E:
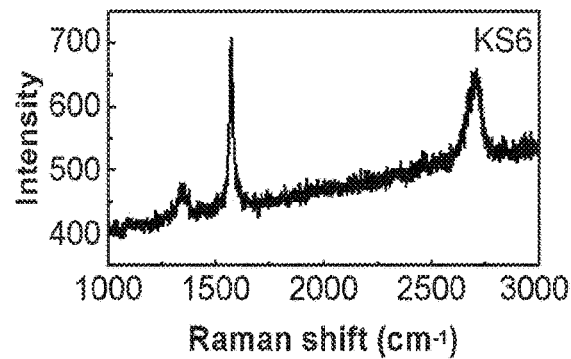
Figure 12F:
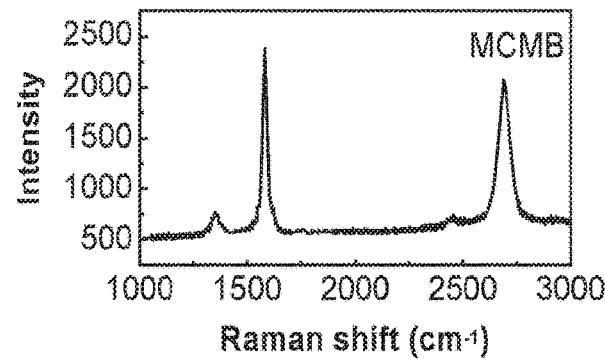
Figure 12G:
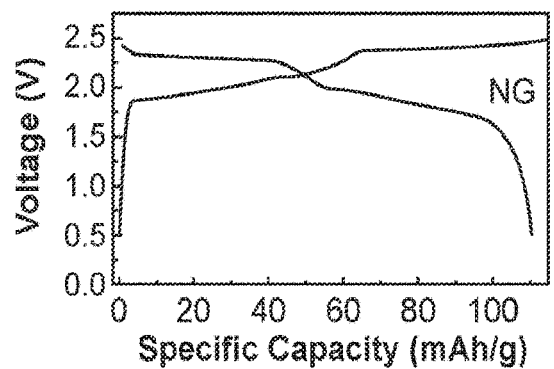
Figure 12H:
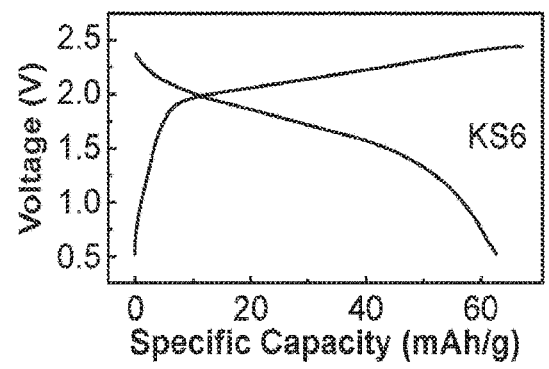
Figure 12I:
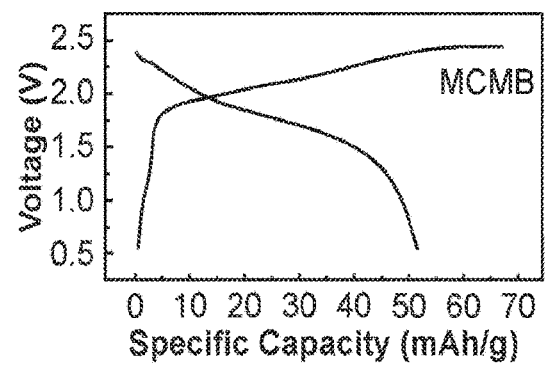

FIG. 11: Electrolyte speciation study. A) Raman spectra of AlCl$_3$/urea=about 1.0, about 1.3, about 1.4, and about 1.5 electrolytes, normalized to peak at about 347 cm$^{-1}$ (AlCl$_4$$^-$). B) Zoom of A) to elucidate lower intensity modes of Al$_2$Cl$_7$$^-$ (about 154, about 310, about 380, about 428 cm$^{-1}$), about 1.3, about 1.4=AlCl$_3$/urea electrolyte spectra omitted for clarity. $^{27}$Al NMR Spectra for C) AlCl$_3$/urea=about 1.3 vs. AlCl$_3$/EMIC=about 1.3 and D) AlCl$_3$/urea=about 1.0 vs. AlCl$_3$/EMIC=about 1.0.

FIG. 12: Electrochemical performances of different graphite materials related to their structure characterizations. The XRD spectra (a-c) and Raman spectra (d-f) of different types of graphite including natural graphite (NG), KS6 and MCMB, respectively. (g-i) Galvanostatic charge and discharge curves of aluminum-ion battery using NG, KS6 and MCMB materials in cathode charging and discharging at a current density of about 66 mA/g. Capacity was recorded between charging and discharging voltages of about 0.5 V and about 2.45 V. The loading amount of NG, KS6 and MCMB is about 4 mg cm$^{-2}$, based on weight of carbon materials without binder.

FIG. 13: Performance of aluminum-ion battery. (a) Galvanostatic charge and discharge curves of an Al/NG cell at a current density of about 66 mA g$^{-1}$. (b) Capacity retention of an Al/NG cell cycled at various current densities, showing good cycling stability at different charge-discharge current densities. (c) and (d) Long-term stability test of an Al/NG cell at about 660 mA g$^{-1}$ and about 198 mA g$^{-1}$, respectively. Capacity was recorded between charging and discharging voltages of about 0.5 V and about 2.45 V. Graphite loading is about 4 mg cm$^{-2}$.

DESCRIPTION

Aluminum-ion batteries present a desirable option for large-scale storage of renewable energy, owing to the high natural abundance of aluminum and its three electron redox properties. An aluminum battery has been developed in which Al$_2$Cl$_7$$^-$ is an anionic species involved in deposition of aluminum, using an acidic mixture of AlCl$_3$/EMIC. However, for large-scale production of aluminum-ion batteries, it would be beneficial to have electrolytes that reduce or avoid the use of such an expensive organic cation—EMI. Furthermore, deposition of aluminum from an anion can pose challenges. Upon adding an electrolyte to a newly assembled battery, a Helmholtz double layer forms as a result of different Fermi energies of an electrode and the electrolyte. Focusing on aluminum, which has a high Fermi energy (being a metal that is readily oxidized), a first layer on a surface of aluminum is composed of cations, which will form a physical barrier to aluminum deposition from an anionic species. Also, during charging, negative potentials are applied to an aluminum electrode, which cause cations to migrate towards the electrode and anions to migrate away from the electrode. Therefore, the deposition of aluminum would be more kinetically favorable, disregarding underlying deposition mechanisms, if the deposition occurred from a cationic species, and aluminum-ion batteries would be more scalable if an ionic liquid electrolyte can be less costly.

A second challenge for aluminum-ion batteries is the extreme hygroscopic nature of various ionic liquids including EMIC and urea based ones, and traces of water can react with an ionic liquid electrolyte and form HCl, which if not removed can cause side reactions that lower the coulombic efficiency of the batteries and shorten battery cycle life. Similar problems can be caused by organic impurities remaining from synthesis of ionic organic salts.

Thirdly, another challenge for aluminum-ion batteries is the development of a suitable substrate as a current collector for a graphite cathode side. Under positive bias charging conditions, the cathode side is under an oxidative potential, and various metals can be oxidized and corroded by an ionic liquid electrolyte, such as Al, copper (Cu), stainless steel and other metal foils. A suitable current collector that is resistant against corrosion is desirable to afford high coulombic efficiencies and long cycle lives for various ionic liquid electrolytes for aluminum-ion batteries in general including EMIC, urea and other organic based ionic liquids.

Moreover, it is desirable to use hydrophilic binders for graphite particles in a cathode in order to allow facile wetting of the graphite particles by an ionic liquid electrolyte. Binders such as polyvinylidene difluoride (PVDF) are hydrophobic, which does not allow adequate wetting by an ionic liquid electrolyte.

To address the challenges above, some embodiments of this disclosure include:

(1) Improved ionic liquids are developed as electrolytes for Al-ion batteries, including ones including, or formed from, a mixture of AlCl$_3$ and urea, AlCl$_3$ and acetamide, AlCl$_3$ and 4-propylpyridine, and AlCl$_3$ and trimethylphenylammonium chloride. Improved electrolytes can be several times (e.g., about 30 times) less expensive than an EMIC-based electrolyte, thereby allowing batteries to be scaled up cost-effectively, and a theoretical energy density also can be higher. Further, resulting batteries are safe as the electrolytes are non-volatile and non-flammable.

(2) Procedures for purification of ionic liquid electrolytes are developed to remove impurities, water and hydrochloric acid, for various ionic liquid electrolytes for aluminum-ion batteries in general including EMIC, urea and other organic based ionic liquids.

(3) Improved substrates are developed as cathode current collectors for Al-ion batteries in general, including carbon fiber paper and carbon cloth, as well as nickel (Ni) substrates coated by protective coatings. These cathode current collectors are useful for various ionic liquid electrolytes for aluminum-ion batteries in general including EMIC, urea and other organic based ionic liquids.

(4) Improved hydrophilic polymer binders are developed for graphitic particles in a cathode for aluminum-ion batteries in general with EMIC, urea and other organic based ionic liquid electrolytes.

Figure 1:
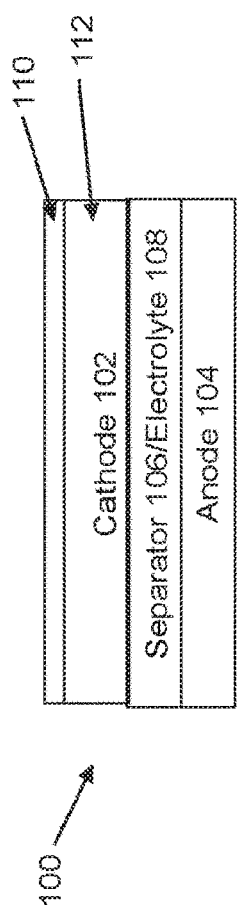
FIG. 1: Schematic of a metal-ion battery.

As shown in an embodiment of FIG. 1, a metal-ion battery 100 includes a cathode 102, an anode 104, and a separator 106 that is disposed between the cathode 102 and the anode 104. The separator 106 prevents electrical shorting of the cathode 102 and the anode 104, and can be selected from a porous membrane such as, for example, a porous glass fiber membrane, a regenerated cellulose membrane, a polyester membrane or a polyethersulfone membrane. These membranes and other hydrophobic membranes, such as polyethylene membrane, can be further coated with a hydrophilic polymer, such as polyacrylic acid and polyvinyl alcohol, and cross-linked by heating.

The battery 100 also includes an electrolyte 108, which is disposed between and in contact with the cathode 102 and the anode 104. The battery 100 is a secondary battery that is rechargeable, although primary batteries also are encompassed by this disclosure.

In the illustrated embodiment, the battery 100 is an aluminum-ion battery, although other types of metal-ion batteries are encompassed by this disclosure. The anode 104 includes aluminum, such as a non-alloyed form of aluminum or an aluminum alloy. More generally, a suitable anode material can include one or more of an alkali metal (e.g., lithium, potassium, sodium, and so forth), an alkaline earth metal (e.g., magnesium, calcium, and so forth), a transition metal (e.g., zinc, iron, nickel, cobalt, and so forth), a main group metal or metalloid (e.g., aluminum, silicon, tin, and so forth), and a metal alloy of two or more of the foregoing elements (e.g., an aluminum alloy).

The electrolyte 108 supports reversible deposition and dissolution (or stripping) of aluminum at the anode 104, and reversible intercalation and de-intercalation of anions at the cathode 102. The electrolyte 108 can include an ionic liquid, which can support reversible redox reaction of a metal or a metal alloy included in the anode 104. Examples of ionic liquids include aluminates, such as ones including, or formed from, a mixture of an aluminum halide and an organic compound. To reduce a water content, the organic compound can be subjected to heating and drying under reduced pressure, such as heating in vacuum (e.g., about $10^{-2}$ Torr, about $10^{-3}$ Torr, or less, and about 70° C.-110° C.) to remove water prior to mixing with an aluminum halide slowly under stirring with cooling to maintain a temperature near room temperature. For example, a suitable ionic liquid can include, or can be formed from, a mixture of an aluminum halide (e.g., $AlCl_3$) and urea; other aliphatic amides including from 1 to 10, 2 to 10, 1 to 5, or 2 to 5 carbon atoms per molecule, such as acetamide, as well as cyclic (e.g., aromatic, carbocyclic, or heterocyclic) amides, as well as combinations of two or more different amides. As another example, a suitable ionic liquid can include, or can be formed from, a mixture of an aluminum halide (e.g., $AlCl_3$) and 4-propylpyridine; other pyridines, as well as other N-heterocyclic compounds (including EMIC or EMI) with 4 to 15, 5 to 15, 4 to 10, or 5 to 10 carbon atoms per molecule, as well as combinations of two or more different N-heterocyclic compounds. As a further example, a suitable ionic liquid for high temperature operations can include, or can be formed from, a mixture of an aluminum halide and trimethylphenylammonium chloride; other cyclic (e.g., aromatic, carbocyclic, or heterocyclic) compounds including a cyclic moiety substituted with at least one amine or ammonium group, as well as aliphatic and cyclic amines or ammoniums, as well as combinations of two or more different amines or ammoniums. Other examples of suitable organic compounds include N-(n-butyl) pyridinium chloride, benzyltrimethylammonium chloride, 1,2-dimethyl-3-propylimidazolium, trihexyltetradecyl-phosphonium chloride, and 1-butyl-1-methyl-pyrrolidinium cations with anions such as tetrafluoroborate, tri-fluoromethanesulfonate and bis(trifluoromethanesulfonyl)imide. During manufacturing, an ionic liquid electrolyte can be formed by slowly mixing or otherwise combining an aluminum halide (e.g., $AlCl_3$) and an organic compound, in which the aluminum halide undergoes asymmetric cleavage to form a haloaluminate anion (e.g., $AlCl_4^-$) and an aluminum halide cation that is datively bonded to the organic compound serving as a ligand (e.g., $[AlCl_2.n(ligand)]^+$). A molar ratio of the aluminum halide and the organic compound can be at least or greater than about 1.1 or at least or greater than about 1.2, and is up to about 1.5, up to about 1.8, up to about 2, or more. For example, the molar ratio the aluminum halide and the organic compound (e.g., urea) can be in a range of about 1.1 to about 1.7 or about 1.3 to about 1.5. In some embodiments, a ligand is provided as a salt or other compound including the ligand, and a molar ratio of the aluminum halide and the ligand-containing compound can be at least or greater than about 1.1 or at least or greater than about 1.2, and is up to about 1.5, up to about 1.8, up to about 2, or more. An ionic liquid electrolyte can be doped, or have additives added, to increase electrical conductivity and lower the viscosity, or can be otherwise altered to yield compositions that favor the reversible electrodeposition of metals. For example, 1,2-dichlorobenzene can be added as a co-solvent to reduce electrolyte viscosity and increase the voltage efficiency, which can result in an even higher energy density. Also, alkali chloride additives can be added to increase the voltage of a battery.

Higher coulombic efficiencies and longer cycle lives can be attained by reducing a content of any residual water, hydrochloric acid (HCl) and organic impurities in the electrolyte 108 for various ionic liquid electrolytes for aluminum-ion batteries in general including EMIC, urea and other organic based ionic liquids. In some implementations, a reduced content of residual water, HCl and organic impurities can be attained by subjecting the electrolyte 108, once formed, to a purification procedure. For example, to remove HCl in the electrolyte 108 formed by residual water, HCl gas resulting from the residual water can be removed by subjecting the electrolyte 108 to reduced pressure, such as under vacuum (e.g., about 0.1 Torr, about $10^{-2}$ Torr, about $10^{-3}$ Torr, or less) for about 0.2 h to about 24 h or for about 0.5 h to about 24 h, until noticeable bubbling ceases. As another example, to remove HCl and organic impurities, one or more metal pieces (e.g., from an aluminum foil) can be added to the electrolyte 108, and, after agitation for a period of time, the electrolyte 108 can be subjected to reduced pressure, such as under vacuum (e.g., about 0.1 Torr, about $10^{-2}$ Torr, about $10^{-3}$ Torr, or less) for about 0.2 h to about 24 h or for about 0.5 h to about 24 h. The battery 100, such as a pouch cell, including the anode 104, the cathode 102, the separator 106 and the electrolyte 108 can be assembled and subjected to vacuum again to remove any residual water and acids prior to sealing the battery 100.

The cathode 102 includes an active material that is capable of reversibly intercalating or otherwise incorporating metal anions from the electrolyte 108, such as intercalating chloroaluminate anions during charging and de-intercalating the chloroaluminate anions during discharging. Suitable cathode active materials can include natural graphite materials in the form of graphite particles or flakes and other materials such as black phosphorous. To allow facile wetting of the graphite particles by the electrolyte 108, the graphite particles can be dispersed and held together in a polymer binder that is hydrophilic. One measure of a hydrophilic nature of a polymer binder is a contact angle between a solid surface formed of the polymer binder and a drop of water disposed on the surface, where the contact angle is the angle at which a liquid-vapor interface intersects a solid-liquid interface. A contact angle less than about 90° (low contact angle) typically indicates that wetting of the surface is favorable (high wetting or hydrophilic), and water will tend to spread over the surface. Suitable hydrophilic polymer binders include those having or characterized by contact angles less than about 90°, such as less than or equal to about 85°, less than or equal to about 80°, less than or equal to about 75°, less than or equal to about 70°, less than or equal to about 65°, or less than or equal to about 60°. Another measure of a hydrophilic nature of a polymer binder is the inclusion of polar groups, such as hydroxyl groups, thio groups, cyano groups (or nitrile groups), nitro groups, amino groups, ammonium groups, amide groups, carboxy groups, ether groups, sulfide groups, and so forth. Examples of suitable hydrophilic polymers for use in a polymer binder include polyacrylic acid (PAA) (with or without various degrees of neutralization), polyvinyl alcohol (PVA), cellulose and cellulose derivatives (e.g., carboxymethyl cellulose (CMC)), alginate, conducting polymers (e.g., poly(3,4-ethylenedioxythiophene) (PEDOT) and polystyrene sulfonate (PSS)), ionic liquid polymers or oligomers, as well as combinations of two or more of the foregoing hydrophilic polymers, as well as combinations of one or more of the foregoing polymers with one or more hydrophobic polymers, such as styrene-butadiene rubber.

During manufacturing, graphite particles (or other cathode active material) can be mixed or otherwise combined with a hydrophilic polymer binder along with a suitable solvent (e.g., water) to form a slurry, and the slurry can be coated or otherwise applied to form a cathode material 112 on a current collector 110. For example, the cathode 102 can be formed by making a slurry of a cathode active material, such as natural graphite particles, dispersed in a hydrophilic polymer binder solution in water, applying the slurry on the current collector 110, and annealing to a temperature between about 70° C. to about 250° C. in vacuum. In the case of a mixed polymer binder containing PAA and PVA, annealing crosslinks the two polymers to form an extended polymer binder network with high hydrophilicity and binding ability for active cathode materials.

To afford resistance against corrosion when used in the current collector 110, a metal substrate (e.g., Ni foil or Ni foam) can be applied with a protective coating, such as including a carbon-containing (or carbonaceous) material derived from pyrolysis of organic compounds deposited on the metal substrate. For example, a carbon or graphitic layer can be formed on Ni by coating Ni with a carbonaceous material, such as pitch dissolved in a solvent, and then heating at about 400° C. to about 800° C. Another example of a protective coating is a coating of a conducting polymer deposited on the metal substrate, such as PEDOT:PSS. In place of a metal substrate, a carbonaceous or carbon-based substrate can be used as the current collector 110. For example, fibrous, carbon-based substrates can be used as corrosion-resistant current collectors, such as carbon fiber paper (CFP), carbon fiber cloth (CFC), graphite fiber paper, and graphite fiber cloth. A carbon-based current collector can be adhered to a metal (e.g., Ni) tab using a conducting carbon-polymer composite adhesive, and the metal tab can be welded to electrical leads for charge and discharge. A pouch cell can be sealed with the metal tab extending outside the pouch with thermoplastic heat sealer between the tab and the pouch cell.

The current collectors, polymer binders, separators, electrolyte purification and battery fabrication methods developed in this disclosure are generally applicable to aluminum-ion batteries in general for various types of ionic liquid electrolytes, including urea and EMIC based electrolytes.

EXAMPLES

The following examples describe specific aspects of some embodiments of this disclosure to illustrate and provide a description for those of ordinary skill in the art. The examples should not be construed as limiting this disclosure, as the examples merely provide specific methodology useful in understanding and practicing some embodiments of this disclosure.

Example 1

Experimental

All electrolytes were made and batteries assembled in an Argon-filled glovebox with <about 5 ppm water and oxygen. Aluminum Chloride ($AlCl_3$) (Alfa Aesar, anhydrous 99.9%) was used as received and opened inside the glovebox.

Electrolyte Purification Method:

To remove hydrochloric acid (HCl) in electrolytes formed by residue water, after electrolytes were prepared, HCl gas resulting from residual water content of the components was removed using vacuum (about $10^{-3}$ Torr) pumping until noticeable bubbling ceased.

To remove organic impurities, aluminum foil (Alfa Aesar, 99%) was added to an electrolyte after removal of a surface oxide layer using sand paper. After stirring overnight, the electrolyte was placed under vacuum once more before addition to a battery, at which point it was a clear liquid—aluminum foil is believed to remove colored organic impurities as well as HCl. Minimal to no bubbling was observed at this stage, and any bubbling was assumed to be mostly due to dissolved Argon gas.

$AlCl_3$: Urea Electrolyte:

Urea (Sigma Aldrich, 98%) (Melting point (MP): about 133-135° C.) was dried as received at about 100-130° C. under vacuum for about 24 h and transported to the glovebox in a vacuum sealed container. If urea is heated past its melting point, the resulting electrolyte (after mixing with $AlCl_3$) is much more viscous, sometimes forming a solid. Battery electrolytes were made by the direct, slow addition of $AlCl_3$ to urea in a glass vial. About 1.3:1, about 1.5:1, about 1.7:1, and about 2:1 molar ratios of $AlCl_3$:urea mixtures were heated briefly at about 130° C. until liquid reaction products formed in substantial quantities, at which point the mixtures were allowed to stir until homogeneous at room temperature. Heating of $AlCl_3$:urea mixtures at lower temperatures (e.g., below about 130° C. or between about 30-40° C.) also can be performed, such as when urea is dried more thoroughly.

$AlCl_3$: Acetamide Electrolyte:

Acetamide (Sigma Aldrich) (MP: about 78-80° C.) was dried by heating to about 100-120° C. while bubbling nitrogen, and immediately moved to the glovebox afterwards—acetamide could not be dried under vacuum due to sublimation. $AlCl_3$ was added slowly under constant magnetic stirring to acetamide such that $AlCl_3$:acetamide=about 1.5:1 by mole. Again the mixture was heated briefly at about 130° C. until a liquid reaction product formed, followed by stirring at room temperature.

AlCl$_3$: 4-Propylpyridine Electrolyte:

4-propylpyridine (TCI, >97%) was dried over molecular sieves for multiple days, and AlCl$_3$ was added slowly under constant magnetic stirring. Drying the 4-propylpyridine proved important to the quality of a final product, which would gel when water was not removed properly. At about the 1:1 equivalence point, a white solid would form, regardless of the rate of AlCl$_3$ addition or degree of drying of the 4-propylpyridine, at which point the remaining AlCl$_3$ was added. Once a homogenous liquid reaction product had formed and ample time for the 4-propylpyridine to substantially completely react had passed (about 24 h), the vacuum treatment described earlier was again applied. It was noted that the addition of aluminum foil to this electrolyte induced a slight color change, which varied depending on the source of aluminum chloride used; however, a resulting battery still showed increased energy density after foil addition.

AlCl$_3$: Trimethylphenylammonium Chloride Electrolyte:

Trimethylphenylammonium chloride (TMPAC) (Sigma Aldrich) was used as received. Mixtures with molar ratios of AlCl$_3$:TMPAC of about 1.7:1 and about 1.3:1 were made for room temperature and about 70° C. battery tests, respectively, by adding TMPAC directly to AlCl$_3$ under constant magnetic stirring. Removal of HCl was done using the vacuum/foil treatment described above.

Results

Figure 2B:
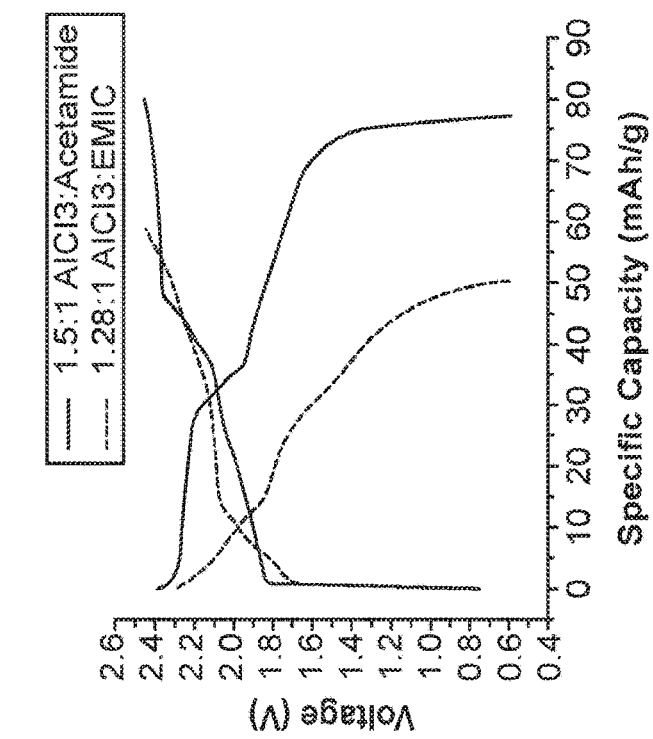
FIG. 2b: Galvanostatic charge/discharge profiles of $AlCl_3$:acetamide=about 1.5:1 compared to $AlCl_3$:EMI=about 1.28:1. 2.45V/0.6V=upper/lower cutoff voltages.
Figure 2A:
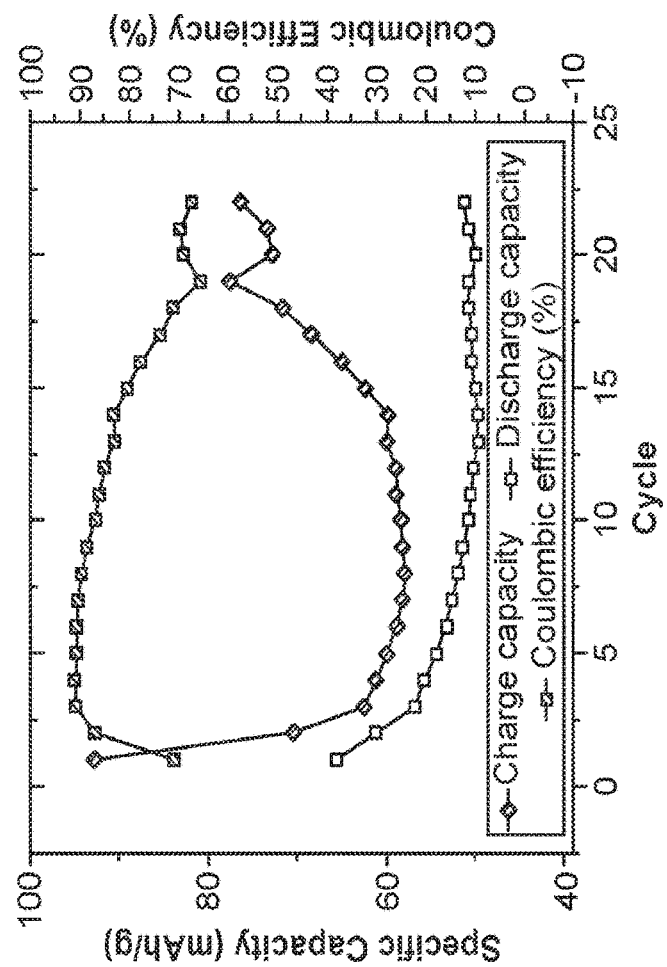
FIG. 2a: Coulombic efficiency and specific capacity data using $AlCl_3$:acetamide=about 1.5:1 electrolyte.

Electrolytes:

A battery including AlCl$_3$:acetamide=about 1.5:1 was tested, and the specific capacity, coulombic efficiency and voltage profiles are plotted in FIGS. 2a,b. Battery-like behavior was observed, with indication of a discharge plateau at about 2 V and lower voltage plateaus at about 1.8 V and about 1.5 V, but these tests yielded lower capacities than an imidazolium-based system. The discharge capacity, which was initially about 65 mAh/g, decayed along with the coulombic efficiency (initially about 90%) as the battery cycled. Interestingly, the charge and discharge profiles have some notable differences compared to those observed in the imidazolium-based system, although the general shapes of the curves are comparable.

Figure 3:
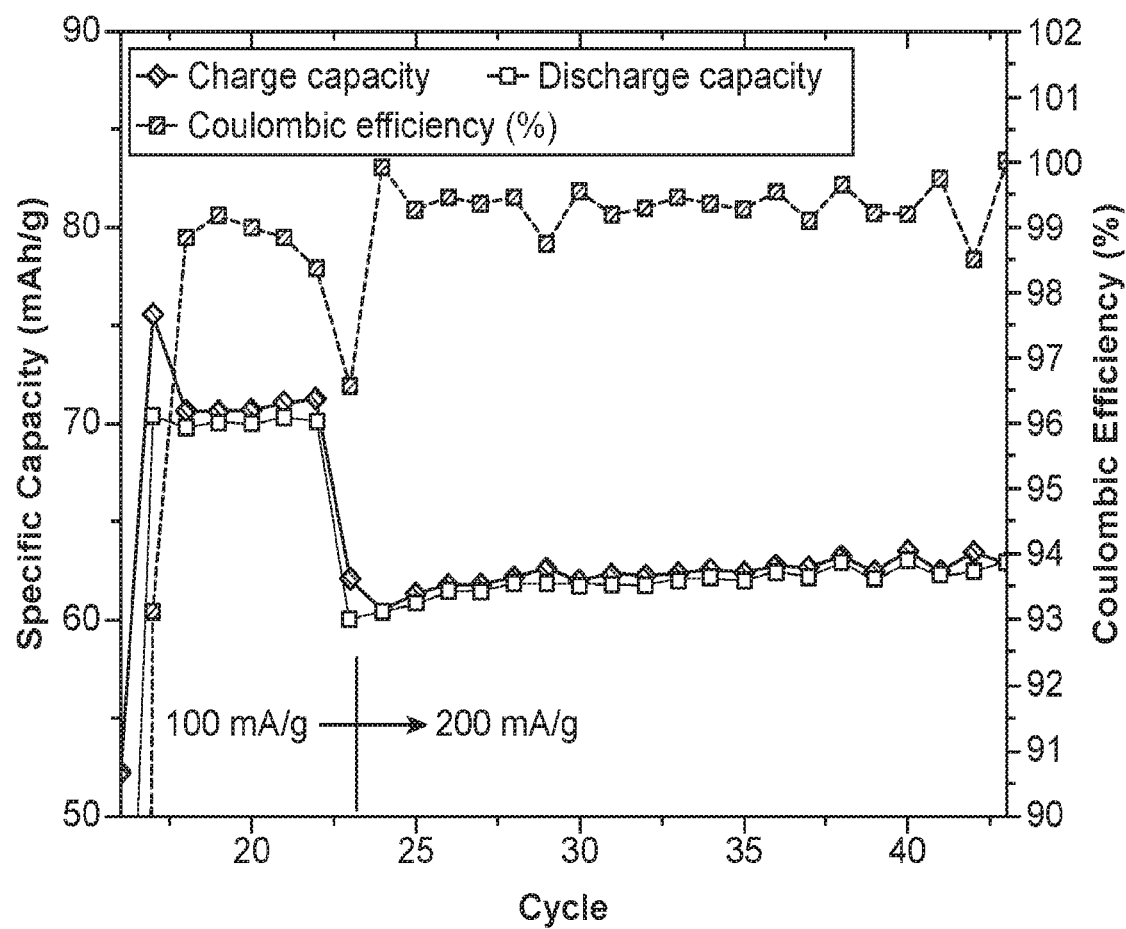
FIG. 3: Coulombic efficiency and specific capacity data for the about 1.3:1 $AlCl_3$:urea electrolyte. Coulombic efficiency remains substantially the same (about 99%) when the rate is doubled from about 100 mA/g to about 200 mA/g.
Figure 4A:
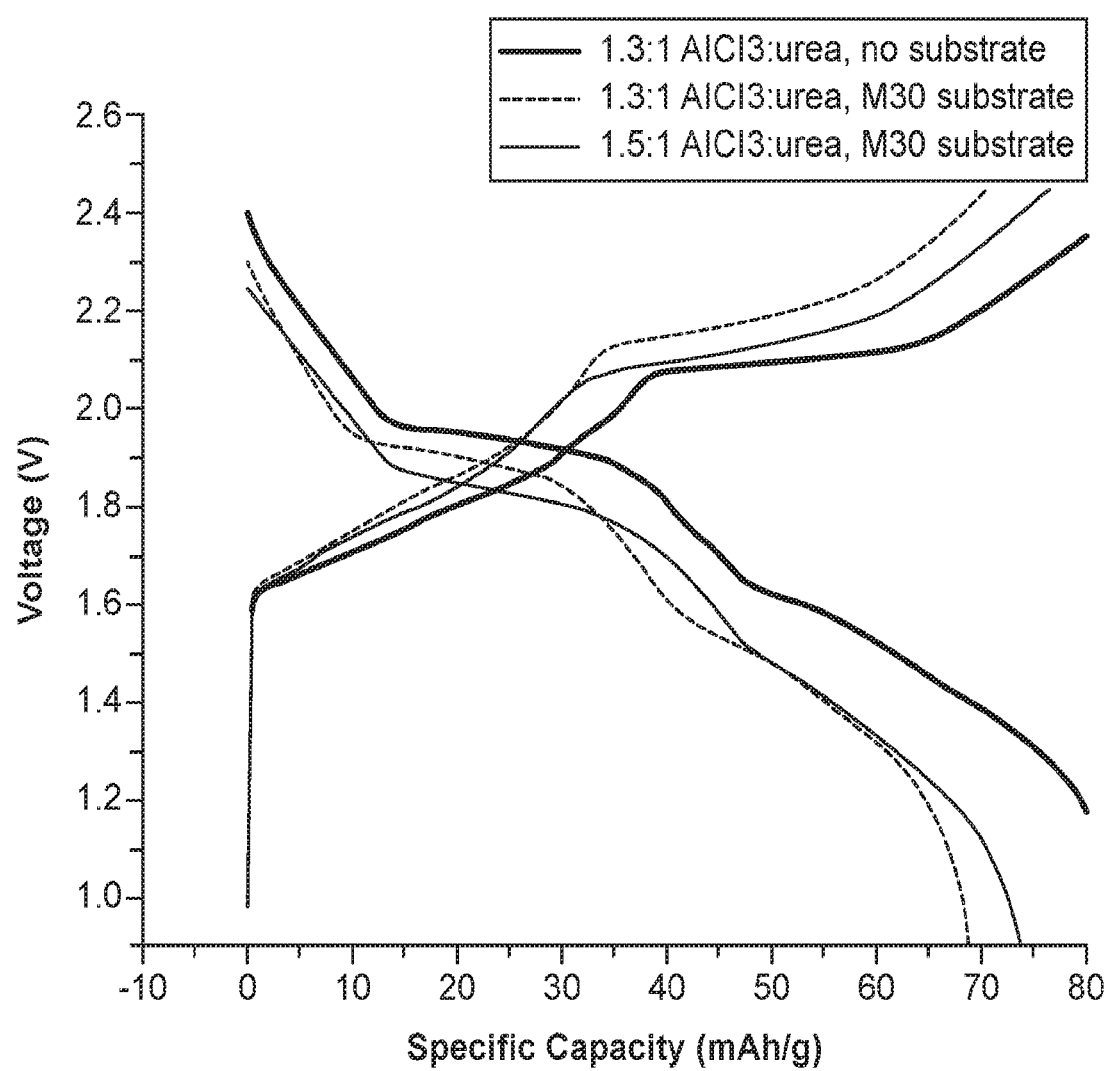
FIG. 4a: Galvanostatic charge/discharge curves for about 1.3:1 $AlCl_3$:urea electrolyte with graphitic material deposited onto M30 carbon fiber substrate compared to deposition directly onto nickel current collector.
Figure 4B:
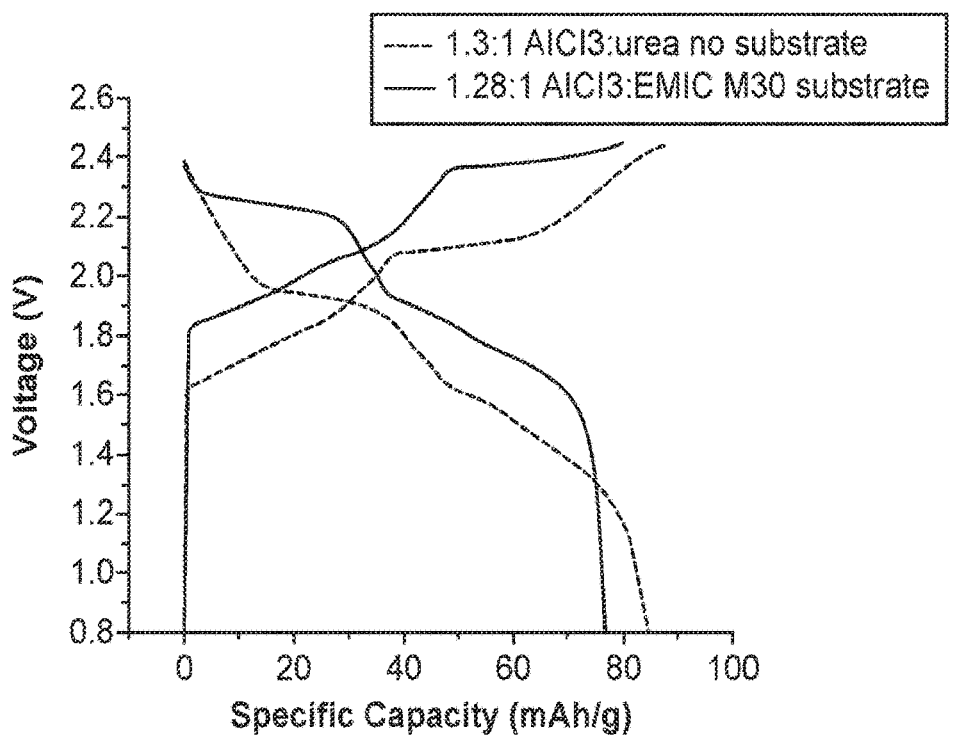
FIG. 4b: Galvanostatic charge/discharge profiles of the about 1.3:1 $AlCl_3$:urea electrolyte compared with the about 1.28:1 $AlCl_3$:EMIC electrolyte.
Figure 4C:
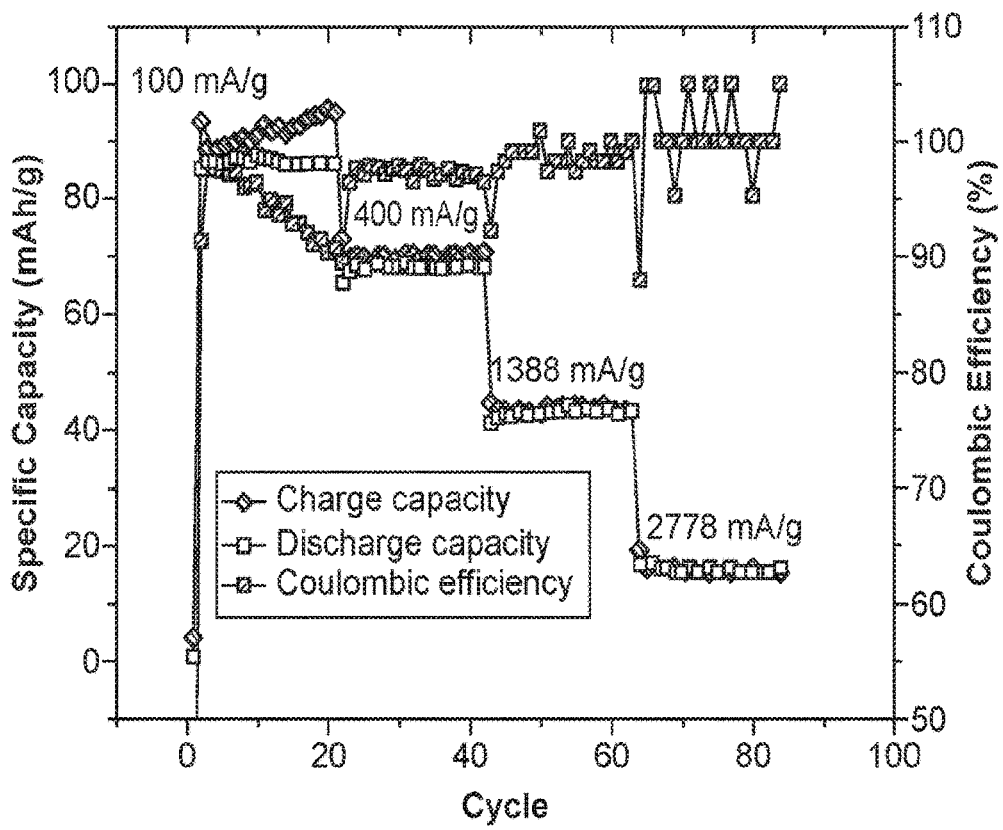
FIG. 4c: Rate capabilities of $AlCl_3$:urea of about 1.3:1 with graphitic cathode material deposited directly onto a nickel current collector.

Tests with the urea-based electrolyte (using Mitsubishi carbon fiber substrate, about 30 g/m$^2$) involved both AlCl$_3$:urea=about 1.5:1 and about 1.3:1 molar ratios. The specific capacities in each case were about 76-78 mAh/g and about 70 mAh/g, respectively, which is similar to the capacity of the imidazolium-based electrolyte, pre-optimization (FIG. 3). Furthermore, the voltage profiles for the urea-based electrolyte are nearly identical in shape to those of the imidazolium-based electrolyte, featuring two main discharge plateaus (occurring at slightly lower voltages) (FIG. 4a). A beneficial aspect of the urea-based electrolyte is the very high coulombic efficiency (FIG. 3), which is relatively invariable as the charging rate is increased, with respect to the imidazolium-based electrolyte. With the imidazolium-based electrolyte, the coulombic efficiency consistently increases as the C-rate increases, likely indicating that there are kinetically hindered (or constant in time) side reactions involved. This trend is practically absent in the urea-based electrolyte. At current densities of about 100 mA/g, the coulombic efficiency is >about 99%, and as the current density is increased the coulombic efficiency remains substantially constant, which indicates that there are fewer side reactions occurring, and which is desirable for long term cycling ability. To illustrate the capacity and rate capability of the urea-based electrolyte, a battery was constructed in which a graphitic material was deposited directly onto a nickel current collector (which is protected from exposure to the bulk electrolyte when carbon fiber substrate is used), and the current density was varied from about 100 mA/g to about 2778 mA/g (FIG. 4c). A slight side reaction can occur with the nickel current collector, which can be observed at lower current densities from the coulombic efficiency data. Regardless, as the rate is dramatically increased from about 400 mA/g to about 2778 mA/g, the coulombic efficiency does not change to a significant extent, again indicating the lack of a side reaction as present in the imidazolium-based system. FIGS. 4a and 4b compare the voltage profiles to the use of a substrate and the imidazolium-based system voltage profiles, respectively.

Figure 5:
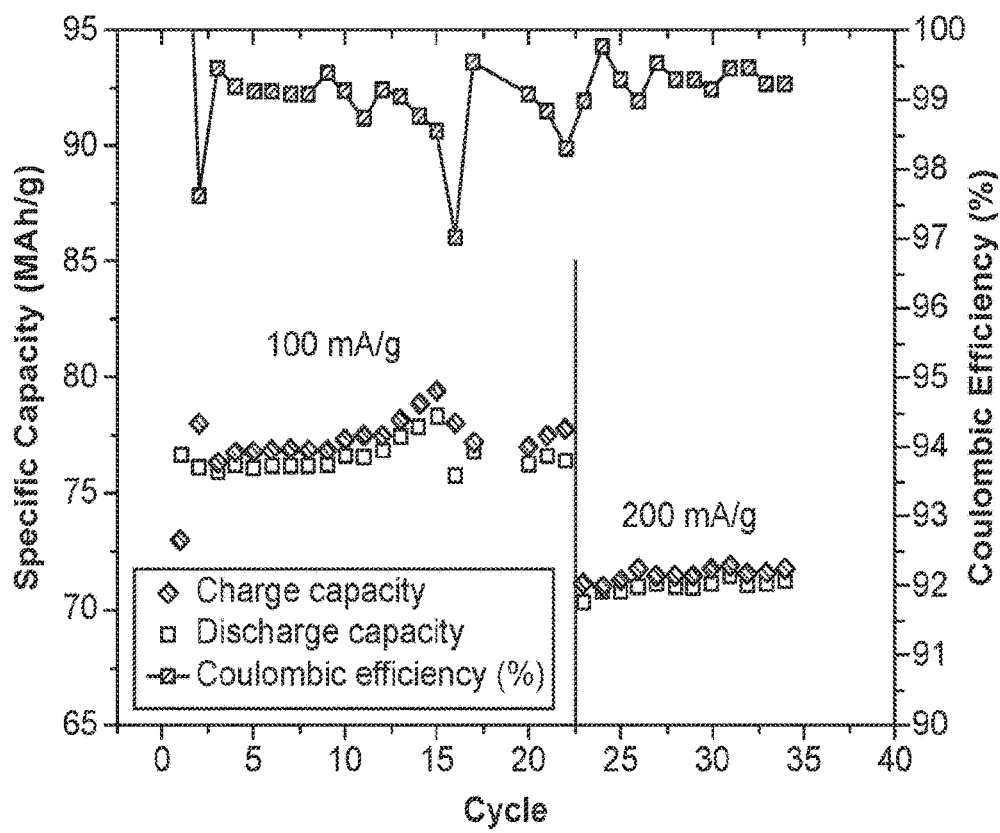
FIG. 5: Coulombic efficiency and specific capacity data for about 1.5:1 $AlCl_3$:urea as the rate is doubled from about 100 mA/g to about 200 mA/g.

Furthermore, the coulombic efficiency remained at about 99% even when the molar ratio was changed from about 1.3:1 to about 1.5:1, which is not the case with the imidazolium-based electrolyte (FIG. 5). When the acidity of the electrolyte in the imidazolium-based electrolyte is increased, the coulombic efficiency systematically drops. Whether or not this is due to trace amounts of HCl remains unclear, but this trend is not observed with the urea-based electrolyte even without extensive purification, which is desirable for scalability. Even though the coulombic efficiency of the imidazolium-based electrolyte is quite high at the acidity used in the battery (>about 98.5% when HCl is properly removed), the absence of this side effect with the urea-based electrolyte is beneficial for the large-scale production of batteries that include such an electrolyte.

Given the above results, a particular benefit of the urea-based electrolyte is that aluminum is deposited from a cationic species, as opposed to the Al$_2$Cl$_7^-$ species in the imidazolium-based electrolyte. Deposition of aluminum in the imidazolium-based electrolyte therefore depends on diffusion of the Al$_2$Cl$_7^-$ species to an electrode, which will be covered by a layer of imidazolium cations as a result of electric double layer formation. With a cationic species for aluminum deposition, a first layer of an electric double layer will be formed by the cationic electroactive species for aluminum deposition, and a current resulting from deposition will no longer be diffusion-limited as these cationic species can migrate to an electrode as current flows. This mechanism provides the potential for reduction of mass transfer voltage losses during charging, as well as an increased energy density based on the mass of reactants involved in the battery reaction. The following simplified half-cell redox reactions are proposed:

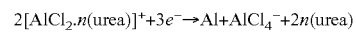
$$2[AlCl_2.n(\text{urea})]^+ + 3e^- \rightarrow Al + AlCl_4^- + 2n(\text{urea})$$

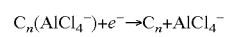
$$C_n(AlCl_4^-) + e^- \rightarrow C_n + AlCl_4^-$$

This gives the overall battery reaction (including counter ions):

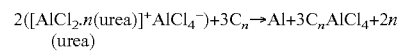
$$2([AlCl_2.n(\text{urea})]^+ AlCl_4^-) + 3C_n \rightarrow Al + 3C_n AlCl_4 + 2n(\text{urea})$$

Based on a capacity of about 75 mAh/g (for about 1.5:1 AlCl$_3$:urea molar ratio), the energy density (including masses of both active graphitic material and electrolyte) was about 71 Wh/kg, based on the energy stored in the battery with a capacity of about 75 mAh/g.

Figure 6A:
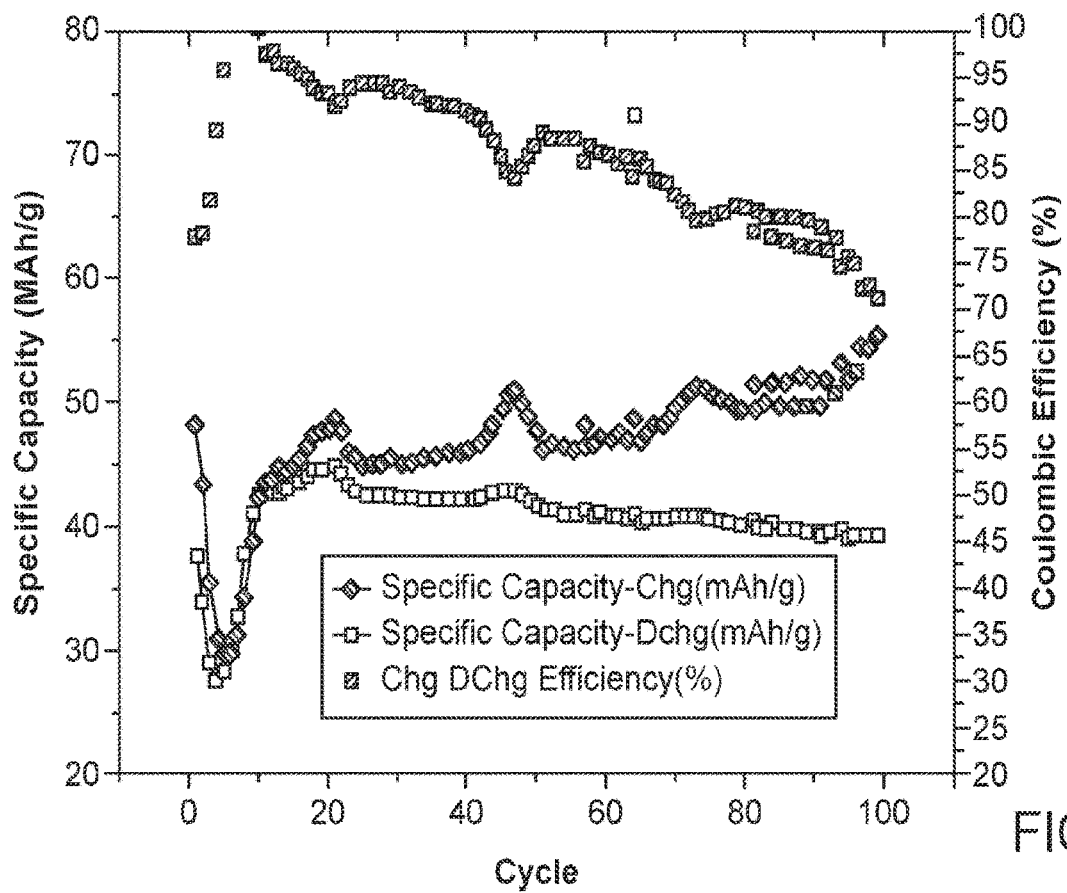
FIG. 6a: Coulombic efficiency and specific capacity data for about 1.3:1 $AlCl_3$:4-propylpyridine electrolyte.
Figure 6B:
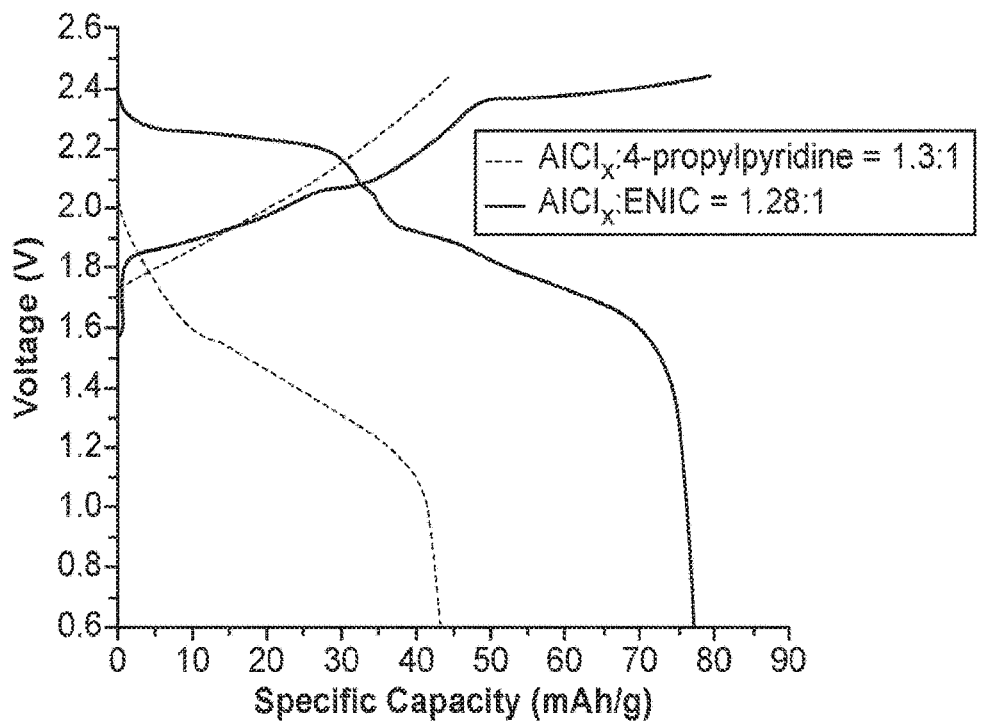
FIG. 6b: Galvanostatic charge/discharge profiles of the about 1.3:1 $AlCl_3$:4-propylpyridine electrolyte compared with the imidazolium-based electrolyte.

About 1.3:1 AlCl$_3$:4-propylpyridine molar ratio mixtures were also tested. Similar to the acetamide-based electrolyte, the coulombic efficiency and the discharge capacity continuously dropped with cycling, and the charge capacity also increased (FIG. 6a), indicating there are side reactions occurring. Furthermore, the voltage profile lacks the higher of the two voltage plateaus, of which there are indications in the acetamide-based electrolyte, and which is noticeably present in the urea-based electrolyte (FIG. 6b). It was noted that residual HCl could lead to protonation of the 4-propylpyridine, rendering it unable to effectively complex with the aluminum, and that substantially complete removal of water from the starting materials would be desirable. Pyridinium-based ionic liquids can react with freshly deposited aluminum, so the decay of the coulombic efficiency in the observed time window here might be a result of residual water. Whether or not the pure $[AlCl_2.n(4\text{-propylpyridine})]^+$ $AlCl_4^-$ liquid would form after electrochemical reduction of the 4-propylpyridinium cation remains to be confirmed.

Figure 7A:
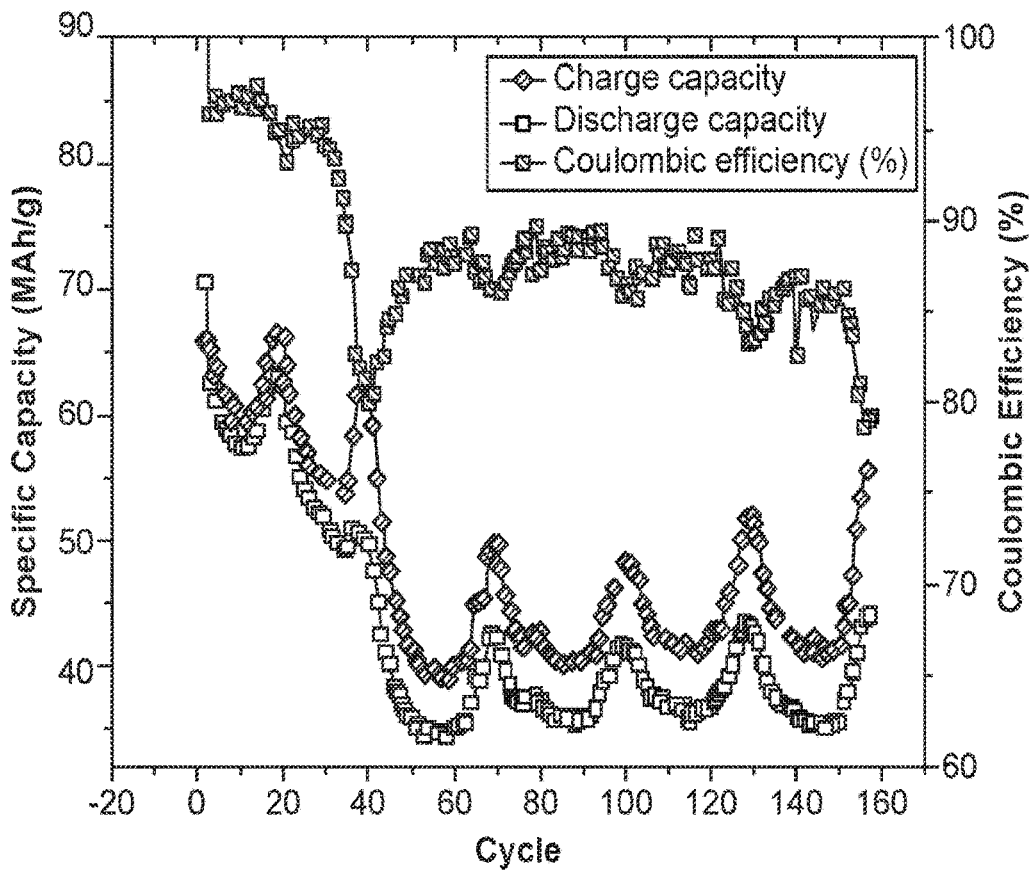
FIG. 7a: Coulombic efficiency and specific capacity data for about 1.7:1 $AlCl_3$:TMPAC.
Figure 7B:
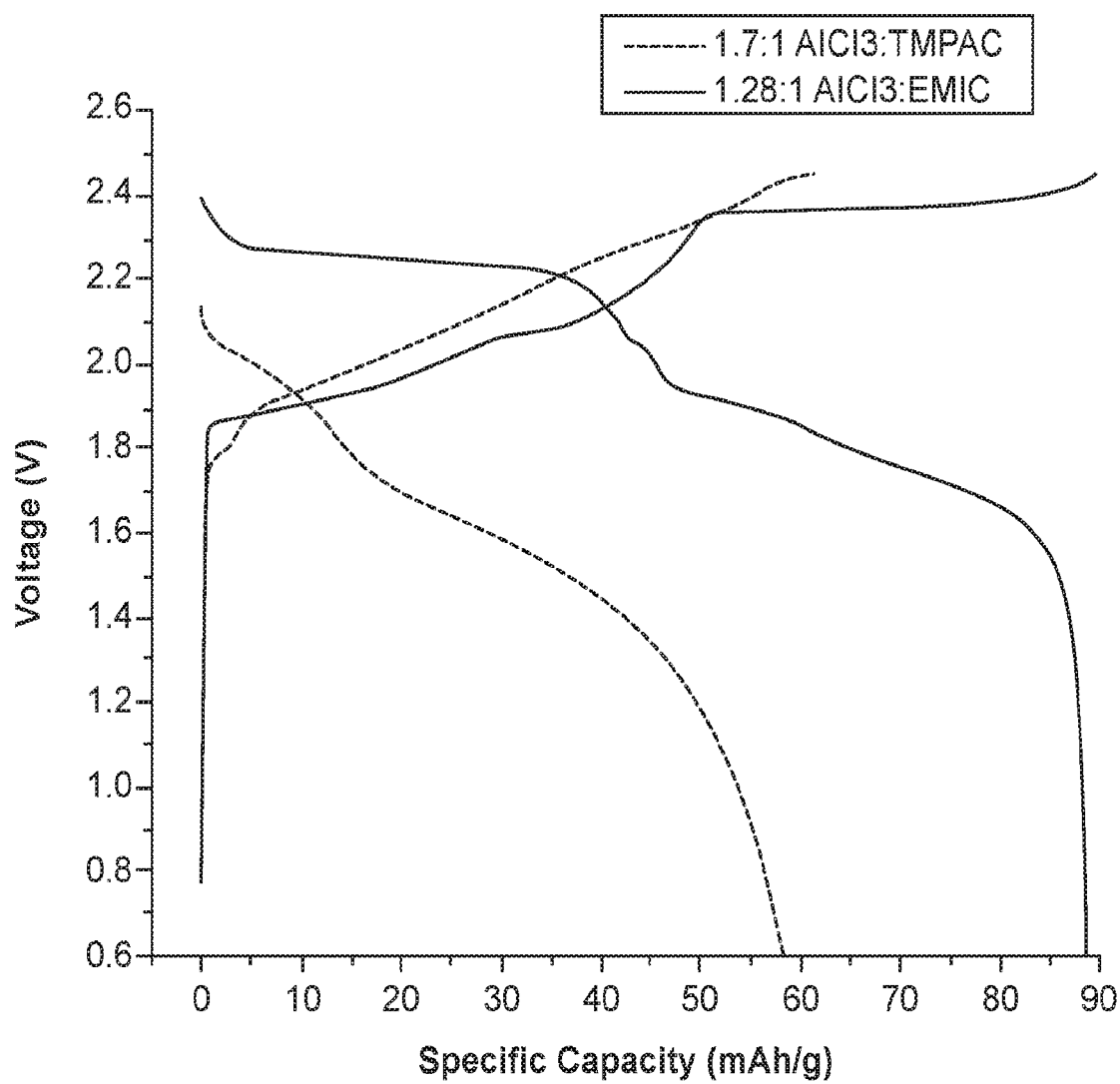
FIG. 7b: Galvanostatic charge/discharge profiles of about 1.7:1 $AlCl_3$:TMPAC compared with the imidazolium-based electrolyte.

In a separate attempt to make a battery that could operate at high temperatures, the temperature sensitive imidazolium cation was substituted with trimethylphenylammonium. The phase diagram for this trimethylphenylammoniumchloride (TMPAC)/$AlCl_3$ electrolyte is of note, with melting points as low as about −75° C. at acidic compositions and as high as about 100° C. at basic compositions. Even an about 1.3:1 $AlCl_3$:TMPAC molar ratio is a solid at room temperature, and initial battery tests involved an about 1.7:1 $AlCl_3$:TMPAC ratio such that the mixture was a liquid at room temperature. The trends in coulombic efficiency and capacity of the electrolyte are illustrated in FIGS. 7a,b. There are oscillations in the data due to temperature variation throughout the day, which is also the case in the imidazolium-based system. However, in the test, the oscillations appear more severe so temperature dependent side reaction may be accelerated by increased ratios of $AlCl_3$ in the electrolyte. The pouch cell used may be incompatible with Lewis acidic $AlCl_3$-based ionic liquids. Nevertheless, the battery is functional and can be further optimized. Initial high temperature tests (about 70° C.) with the about 1.3:1 $AlCl_3$:TMPAC ratio indicated a side reaction which occurred before the cutoff voltage of about 2.45V, and which indicated that this electrolyte system may be sensitive to HCl impurities.

Purification Method of Electrolytes:

The procedure detailed above in the Experimental Section can remove HCl and other impurities from ionic liquid electrolytes, which is desirable to reduce side reactions, enhance coulombic efficiency and prolong the cycle life of an Al battery.

Current Collectors for Al Battery Cathode:

Ni Substrate.

Bare Ni foil or Ni foam can be used as current collectors. Natural graphite particles can be loaded onto such a Ni-based substrate with a binder. Ni is found to be more resistive to corrosion in Al-ion battery than other metals on the cathode side.

Ni foil or Ni foam can be coated with a carbon or graphite layer by various methods to impart enhanced corrosion resistance. One such method is to grow a carbon or graphitic layer on Ni by coating Ni with a carbon-rich material, such as pitch dissolved in a solvent, and then heating at about 400-800° C. Another protective coating is a conducting polymer layer such as poly(3,4-ethylenedioxythiophene):polystyrene sulfonate (PEDOT:PSS). A graphite/polymer binder can also coat Ni densely and act as a protective coating as well as an active cathode layer.

Carbon-Based Substrate as Cathode Current Collector.

Carbon Fiber Paper (CFP).

CFPs of a low degree of graphitization do not allow for significant $AlCl_4^-$ anion intercalation, giving near zero capacity as an Al battery cathode. These CFPs are suitable as current collectors by pasting graphite particles in a polymer binder slurry onto the CFPs followed by drying. The CFPs are highly resistant to corrosion during Al battery operation. Suitable CFPs include, for example, Mitsubishi's CF paper sheet NW23Y030, NW23Y090 and AvCarb-MGL-280 and Sigaret 25AA. The CFP can be adhered onto metal tabs using conducting carbon glue followed by drying. The metal tab can be spot welded to form electrical contacts outside pouch cells. Alternatively, the CFP when extending outside a pouch cell can be filled with a carbon-polymer composite glue to fill pores and used as a tab that bridge the inside and outside of the pouch cell. The continuous gas tight film with the carbon glue filling can be heat sealed to close the pouch.

Carbon Fiber Cloth (CFC).

CFCs of a low degree of graphitization do not allow for significant $AlCl_4'$ anion intercalation, giving near zero capacity as an Al battery cathode. These CFCs are suitable as current collectors by pasting graphite particles in a polymer binder slurry onto the CFCs followed by drying. The CFCs are highly resistant to corrosion during Al battery operation. Suitable CFCs include, for example, hydrophilic carbon cloths available under the ELAT® brand. The CFC can be adhered onto metal tabs using conducting carbon glue followed by drying. The metal tab can be spot welded to form electrical contacts outside pouch cells. Alternatively, the CFC can be filled with a carbon-polymer composite glue to fill the pores and becomes a continuous gas tight film and sealed by heat sealing polymer. Alternatively, the CFC when extending outside a pouch cell can be filled with a carbon-polymer composite glue to fill pores and used as a tab that bridge the inside and outside of the pouch cell. The continuous gas tight film with the carbon glue filling can be heat sealed to close the pouch.

Polymer Binders for Graphite Particles in Al-Ion Battery Cathode:

A Polyacrylic Acid (PAA)/Polyvinyl Alcohol (PVA)-Based Polymer Binder for Graphite Particles.

Natural graphite particles are dispersed in water containing about 10 wt. % PAA and about 3 wt. % PVA and stirred to make a slurry. The slurry is applied to a current collector as described above, at a loading of about 2-20 mg/cm$^2$, followed by drying at about 70-150° C. in vacuum for about 3 h or longer to thoroughly remove water, leaving graphite particles packed on the current collector to form a cathode for an Al battery. Further, several weight percent of graphite fibers can be added to the slurry to improve electrical conductivity of the cathode.

A Carboxymethyl Cellulose (CMC)/Styrene-Butadiene Rubber (SBR)/Graphite Fiber-Based Polymer Binder for Graphite Particles.

Natural graphite particles are dispersed in water containing about 10 wt. % CMC and about 1 wt. % SBR and stirred to make a slurry. The slurry is applied to a current collector as described above, at a loading of about 2-20 mg/cm$^2$, followed by drying at about 70-200° C. in vacuum for about 3 h or longer to thoroughly remove water, leaving graphite particles packed on the current collector to form a cathode for an Al battery. Graphite fibers can be added to the slurry to improve electrical conductivity of the cathode.

A PEDOT/PSS/Graphite Fiber-Based Polymer Binder for Graphite Particles.

Natural graphite particles are dispersed in water containing about 10 wt. % PEDOT and about 1 wt. % PSS conducting polymer and stirred to make a slurry. The slurry is applied to a current collector as described above, at a loading of about 2-20 mg/cm$^2$, followed by drying at about 70-200° C. in vacuum for about 3 h or longer to thoroughly remove water, leaving graphite particles packed on the current collector to form a cathode for an Al battery. Graphite fibers can be added to the slurry to improve electrical conductivity of the cathode.

An Ionic Liquid Polymer Binder for Graphite Particles.

Natural graphite particles are dispersed in water containing ionic liquid polymer or oligomer and stirred to make a slurry. The slurry is applied to a current collector as described above, at a loading of about 2-20 mg/cm$^2$, followed by drying at about 70-200° C. in vacuum for about 3 h or longer to thoroughly remove water, leaving graphite particles packed on the current collector to form a cathode for Al battery.

Conclusion

Four different battery electrolytes were investigated as replacements for the 1-ethyl-3-methylimidazolium tetrachloroaluminate ionic liquid. When mixed with AlCl$_3$, three ligands (acetamide, urea, and 4-propylpyridine) yielded ionic liquid electrolytes that afforded battery-like behavior. Urea was the most successful of these ligands, yielding discharge capacities of about 76-78 mAh/g with about 99% coulombic efficiencies, which did not noticeably vary with charging rate, which indicates this electrolyte system has fewer side reactions than the AlCl$_3$/1-ethyl-3-methylimidazolium chloride-based system. The energy density was also increased from about 64 Wh/kg to about 71 Wh/kg, based on preliminary tests, and the rate capability is good despite the increased viscosity of the electrolyte. Through optimization of the electrolyte such that the voltage is as high as the imidazolium-based electrolyte, a resulting battery can have a theoretical energy density of about 111 Wh/kg, which is closer to lithium-ion batteries. Furthermore, urea is stable up to about 152° C., non-toxic, and currently manufactured at large scales at an ultralow price of about \$0.5/kg. The ionic liquid purification method, the cathode current collectors and graphite polymer binders are also desirable for battery development.

Example 2

Preparation and Purification of Electrolyte: AlCl$_3$/EMIC=about 1.3 by Mole:

EMIC was pre-heated at about 70° C. under vacuum in an oven for about 1 day to remove residual water and then immediately moved into a glovebox. About 1.78 g EMIC is added into an about 20 mL vial at room temperature, followed by slow addition of about 2.08 g AlCl$_3$ in 4-5 portions, mixing for about 5-10 min during each portion. Vigorous stirring is maintained throughout the mixing process. Once all AlCl$_3$ was dissolved, small Al pieces were added to the electrolyte and stirred overnight at room temperature. Subsequently, the electrolyte was held under vacuum for about 20 min in the anti-chamber of the glovebox. The treated electrolyte was stored in the glovebox for further use.

Procedure for Forming Slurries:

Slurry 1: (about 89 wt. % graphite particles (grade 3061)/about 4 wt. % CMC/about 2 wt. % SBR/about 5 wt. % graphite fibers, on ELAT® carbon fiber cloth, about 70° C. annealing for about 2 h)—Mix about 802 mg of 3 wt. % Na-CMC gel in de-ionized (DI) water, about 241 mg of 5 wt. % SBR dispersed in DI water, about 30 mg of chopped graphite fiber, about 534 mg of graphite (grade 3061), and about 1.2 mL of DI water, with vigorous stirring overnight at room temperature (RT) to yield a viscous slurry.

Slurry 2: (about 87 wt. % graphite particles/about 10 wt. % PAA/about 3 wt. % PVA, on M30 carbon fiber paper, about 130° C. annealing for about 2 h)—Mix about 225 mg of 25 wt. % PAA aqueous solution, about 169 mg of 10 wt. % PVA aqueous solution, about 489 mg of graphite particles, and about 0.4 mL of DI water, with vigorous stirring overnight at RT to yield a viscous slurry.

Fabrication of Electrode and Pouch Cell:

An electrode was made by using a small spatula to uniformly coat a slurry onto a substrate (ELAT or M30, about 2 cm$^2$). The electrode is dried on a hot plate at about 100° C. for about 5 min and weighed to evaluate the loading. Afterwards, the electrode was vacuum-annealed for about 2 h at about 70° C. or about 130° C. The heated electrode was immediately weighed to calculate the exact loading and then used to fabricate a pouch cell (electrolyte not yet present). The fabricated pouch was heated at about 70° C. overnight under vacuum and then immediately moved into the glovebox. Finally the pouch was filled by the purified about 1.3 ratio electrolyte, held under vacuum for about 2 min in the anti-chamber, and sealed.

Example 3

A High Coulombic Efficiency Aluminum-Ion Battery Using an AlCl$_3$-Urea Ionic Liquid Analogue Electrolyte In recent years, impressive advances in harvesting renewable energy have led to a pressing demand for the complimentary energy storage technology. Here, a high coulombic efficiency (about 99.7%) Al battery is developed using earth-abundant aluminum as the anode, graphite as the cathode, and an inexpensive ionic liquid analogue electrolyte made from a mixture of AlCl$_3$ and urea in about 1.3:1 molar ratio. The battery displays discharge voltage plateaus at about 1.9 V and about 1.5 V (average discharge=about 1.73 V) and yielded a specific cathode capacity of about 73 mAh g$^{-1}$ at a current density of about 100 mA g$^{-1}$ (about 1.4 C). High coulombic efficiency over a range of charge-discharge rates and stability over about 150-200 cycles was demonstrated. In-situ Raman spectroscopy showed chloroaluminate anion intercalation/deintercalation of graphite in the cathode side during charge/discharge and indicated the formation of a stage 2 graphite intercalation compound when fully charged. Raman spectroscopy and nuclear magnetic resonance indicated the existence of AlCl$_4^-$, Al$_2$Cl$_7^-$ anions and [AlCl$_2$.(urea)$_n$]$^+$ cations in the urea/AlCl$_3$ electrolyte when an excess of AlCl$_3$ was present. Aluminum deposition therefore proceeded through two pathways, one involving Al$_2$Cl$_7^-$ anions and the other involving [AlCl$_2$.(urea)$_n$]$^+$ cations. This battery is desirable as a high performance, low cost energy storage device.

Inexpensive, high-rate (fast charge/discharge) rechargeable batteries with long cycle lives are desired for grid-scale storage of renewable energy, as it is becoming increasingly important to replace fossil fuels. Lithium-ion batteries (LIBs) are expensive and have limited cycle lives, which makes them non-ideal for grid-scale energy storage. Furthermore, high-rate capability is desired for use in the grid, under which conditions LIBs become increasingly unsafe due to the flammability of the electrolytes used. Batteries based on aluminum offer a viable alternative due to aluminum's three-electron redox properties (offers potential for high capacity batteries), stability in the metallic state, and very high natural abundance. Furthermore, the development of these batteries based on non-flammable electrolytes of low toxicity is desired for reducing safety hazard and environmental impact. For this reason, ionic liquids (ILs) are investigated for energy storage due to their low vapor pressure and wide electrochemical windows, unfortunately with the caveat of high cost in most cases. A class of ionic liquids, referred to as ionic liquid analogues (ILAs) or so-called deep eutectic solvents, generally formed through a mixture of a strongly Lewis acidic metal halide and Lewis basic ligand, can have comparable electrochemical and physical properties with reduced cost and environmental footprint. An ILA can be derived from a mixture of $AlCl_3$ and an oxygen donor amide ligand (urea or acetamide), in which ions are formed through the heterolytic cleavage of $AlCl_3$ (the $Al_2Cl_6$ unit) giving $AlCl_4^-$ anions and $[AlCl_2 \cdot (ligand)_n]^+$ cations, with the latter responsible for reductive aluminum deposition. Other Lewis basic ligands can form ILAs when mixed with $AlCl_3$, which are capable of effective aluminum deposition.

A secondary Al battery system is developed based on the reversible deposition/stripping of aluminum at the Al negative electrode and reversible intercalation/deintercalation of chloroaluminate anions at the graphite positive electrode in a non-flammable 1-ethyl-3-methylimidazolium chloroaluminate (EMIC-$AlCl_3$) ionic liquid electrolyte. A ratio of $AlCl_3$/EMIC=1.3 by mole is used such that $Al_2Cl_7^-$ is present in the (acidic) electrolyte to facilitate aluminum deposition. During charging, $Al_2Cl_7^-$ is reduced to deposit aluminum metal, and $AlCl_4^-$ ions intercalate (to maintain neutrality) in graphite as carbon is oxidized. During discharge, this battery exhibits a cathode specific capacity of about 70 mAh $g^{-1}$ with a coulombic efficiency (CE) of about 97-98%, and ultra-high charge/discharge rate (up to about 5000 mA $g^{-1}$) for over 7000 cycles. However, room for improvement exists as the parameter space for the Al battery remains largely unexplored. The three-electron redox properties of aluminum allow a theoretical specific anode capacity of about 2980 mAh/g, so there is potential for much higher overall capacity (and specific energy) of the battery through the investigation of additional cathode and electrolyte materials. Furthermore, while the about 97-98% CE of this battery is higher than those of most aqueous battery systems, there is still significant room for improvement. State-of-the-art LIBs are capable of about 99.98% CE, a benchmark for alternative battery systems. Another consideration is that the Al battery electrolyte uses 1-ethyl-3-methylimidazolium chloride (EMIC), which is relatively expensive. Other electrolytes for this system should support reversible aluminum deposition/dissolution. In this example, investigation is made of the performance of a rechargeable Al battery using an ILA electrolyte based on urea, a superior compound in terms of cost (about 50 times less expensive than EMIC) and eco-friendliness.

Results and Discussion:

Cyclic Voltammetry and Galvanostatic Charge/Discharge of Al Battery.

Figure 8A:
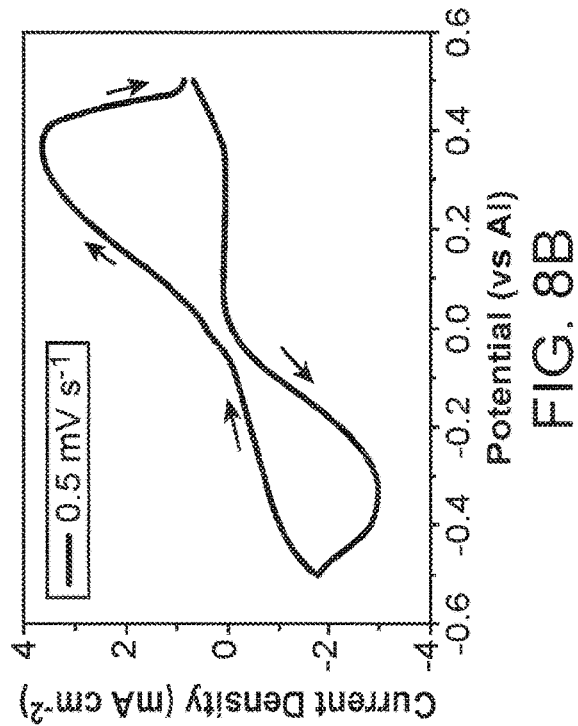
FIG. 8: Cyclic voltammetry of graphite and aluminum electrodes in $AlCl_3$/urea=about 1.3 electrolyte (by mole). A) graphite intercalation/deintercalation (about 1 mV s$^{-1}$), with corresponding major battery charge/discharge curve features indicated; B) aluminum deposition and stripping (about 0.5 mV s$^{-1}$) using three aluminum electrode setup. Data was recorded during the 5th cycle, and it typically took several cycles to reach a stable shape of the CV curve. Note that CV tests were performed in pouch cell configuration, with working and counter electrodes separated by glass fiber paper (which was saturated with electrolyte), so that these tests would represent the battery setup used. C) Galvanostatic charge/discharge curve using $AlCl_3$/urea=about 1.3 electrolyte at about 100 mA g$^{-1}$ (cycle 20). D) Schematic of battery charging (Al deposition and anion intercalation in graphite).
Figure 8B:
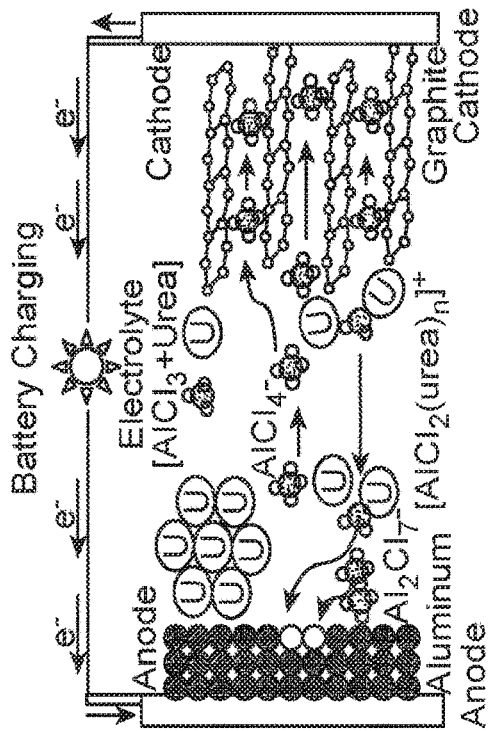
Figure 8C:
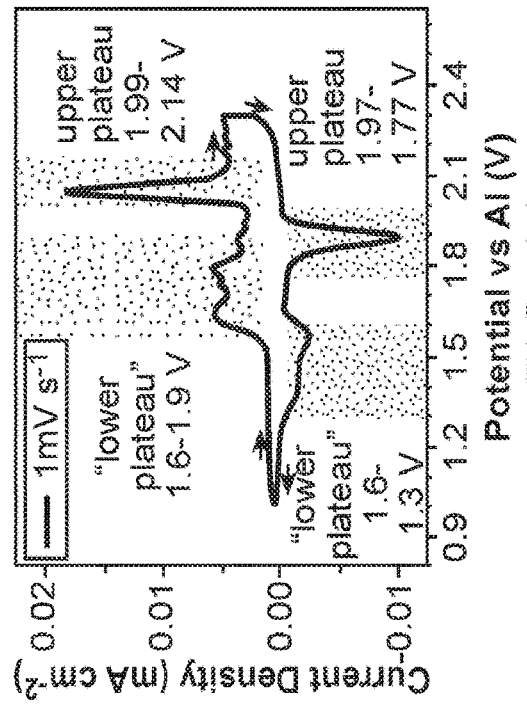
Figure 8D:
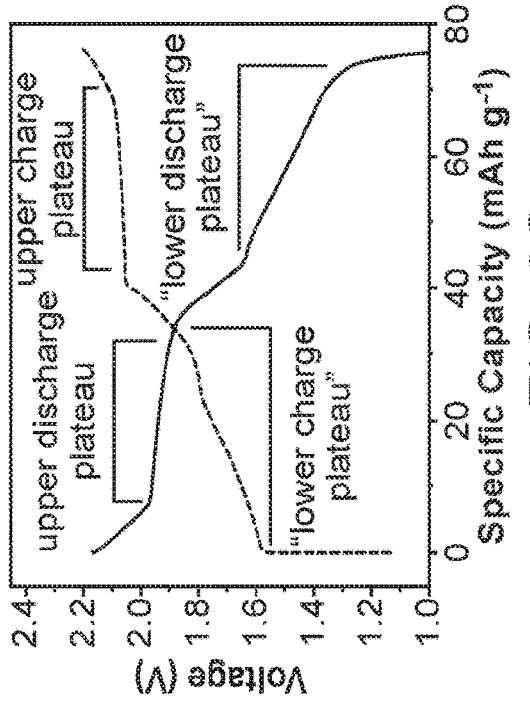

The battery cathode was constructed using a graphite powder/polymer binder pasted onto a carbon fiber paper substrate, and the anode was free-standing, high-purity Al foil. $AlCl_3$/urea electrolyte was kept below about 40° C. during mixing to mitigate against electrolyte decomposition. Residual HCl impurities were removed by adding Al foil under heat and vacuum, followed by the addition of ethylaluminum dichloride. FIG. 8 shows the cyclic voltammogram (CV) of the Al and graphite electrodes in the $AlCl_3$/urea (by mole)=about 1.3 electrolyte, a ratio that was found to yield the battery with the highest capacity with good cycling stability. Several graphite oxidation peaks are observed in the about 1.6-2.0 V (vs. Al) range, while another well-defined peak appeared at about 2.05 V (FIG. 8A). These processes, as well as the corresponding reduction events on the negative sweep, were correlated with the galvanostatic charge-discharge curve (FIG. 8C) for a battery with about 5 mg $cm^{-2}$ loading of active graphitic material. The redox processes are largely reversible but somewhat kinetically hindered showing relatively wide peaks (FIG. 8A), most likely as a result of the high viscosity of the electrolyte. The deposition/dissolution of aluminum (FIG. 8B) was also quite reversible. Based on the aluminum stripping/dissolution reaction and chloroaluminate anion intercalation in graphite, battery mechanisms are proposed and illustrated schematically in FIG. 8D.

FIG. 9 shows galvanostatic charge-discharge data for the Al-graphite cell using the $AlCl_3$/urea ILA electrolyte. Initial cycling at about 100 mA $g^{-1}$ involved about 5-10 cycles for stabilization of the capacity and CE, indicating side reactions during this time. The CE during first cycle was consistently about 90%, and then (during the first 5-10 cycles) increased above 100% until a stable capacity was reached (at which point CE was stabilized at about 99.7%) (FIG. 9A). The phenomenon of CE>100% is not observed in the EMIC-$AlCl_3$ electrolyte system and therefore might involve side reactions with the cationic aluminum species or unbound urea. The boxed region of FIG. 9A (enlarged in FIG. 9B) demonstrates the capacity at varied charge-discharge rate using two different cutoff voltages (about 2.2, about 2.15 V—chosen based on FIG. 8A CV results), after which cycling at about 100 mA $g^{-1}$ was resumed until about 180 cycles. A slight decay in CE was observed over this time but it remained >about 99%. Despite the slight decay in coulombic efficiency, energy efficiency increased slightly over cycling (due to increasing voltage efficiency), yielding values of about 87.8% and about 90.0% at specific currents of about 100 mA $g^{-1}$ and about 50 mA $g^{-1}$, respectively. The effects of rate on the galvanostatic charge-discharge curves are shown in FIG. 9C, and reasonable capacities of about 75 mAh $g^{-1}$, about 73 mAh $g^{-1}$, and about 64 mAh $g^{-1}$ were obtained at about 50 mA $g^{-1}$ (about 0.67 C), about 100 mA $g^{-1}$ (about 1.4 C), and about 200 mA $g^{-1}$ (about 3.1 C) specific currents, respectively.

In Situ Raman Spectroscopy.

Figure 10A:
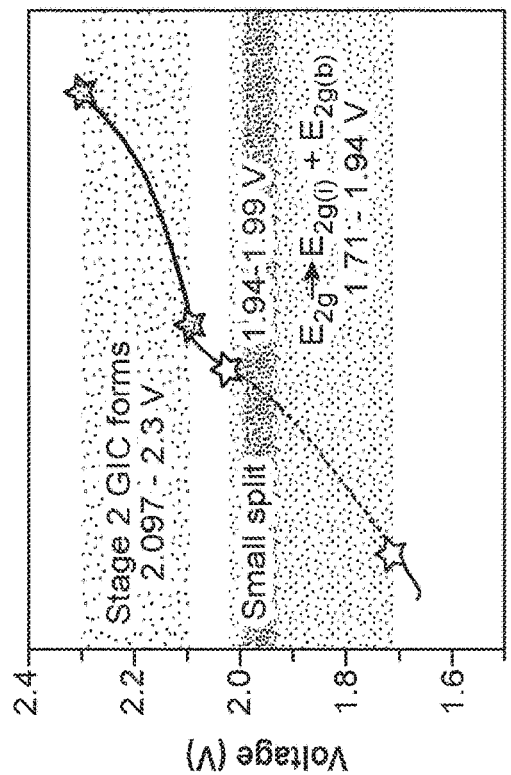
Figure 10B:
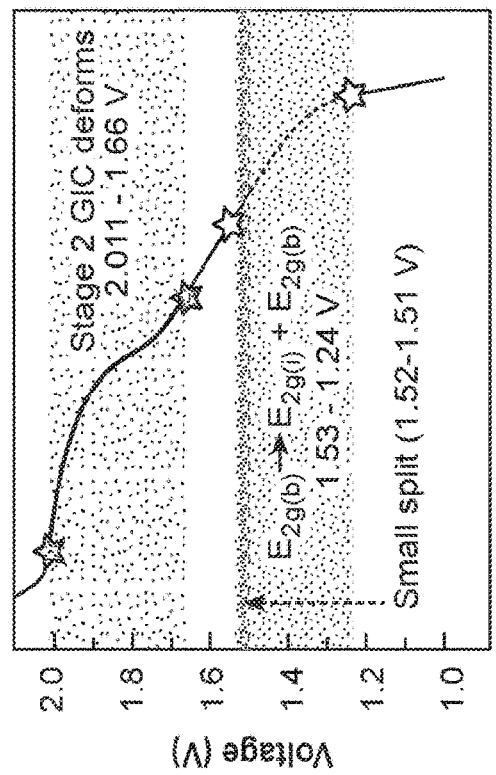
Figure 10C:
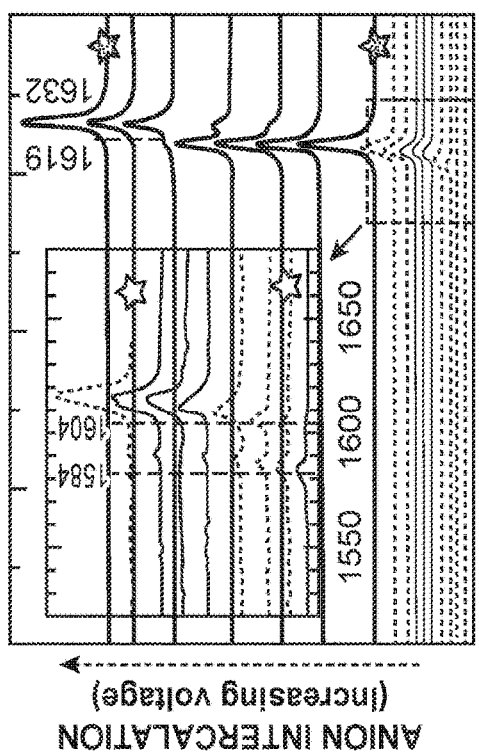

In-situ Raman scattering during charging/discharging experiments were performed to investigate the changes to the graphite structure during battery operation. FIG. 10 displays spectra recorded during charge/discharge at a rate of about 50 mA $g^{-1}$ correlated to the respective regions of the galvanostatic charge/discharge curve. The data were recorded in the battery's 81st charge-discharge cycle, without observing noticeable increase in the graphite defect-related D-band, indicating high graphite structural integrity through chloroaluminate intercalation/deintercalation cycles. Immediately upon beginning the lower plateau charging process, the G-band of pristine graphite (about 1584 $cm^{-1}$) split by about 20 $cm^{-1}$. This splitting resulted from rearrangement of positive charges on the boundary layers of the graphite during intercalation. Boundary layers adjacent to intercalant layers experienced more positive charges, leading to a large blue shift in the $E_{2g}$ band for these layers, giving rise to two different $E_{2g}$ peaks overall, inner (i) and outer (b) (FIG. 10A inset). Based on the ratio of the intensities of these two peaks, the intercalation stage (n>2) at that moment in time can be calculated based on the following equation:

$$\frac{I_i}{I_b} = \frac{\sigma_i}{\sigma_b} \frac{(n-2)}{2}$$

where $\sigma_i/\sigma_b$ is the ratio of Raman scattering cross sections, which was assumed to be unity. This initial splitting therefore indicated the formation of a dilute stage 4-5 intercalation compound, and as charging continued the two peaks steadily blue shifted with increasing potential/capacity of the battery. The $E_{2g(b)}$ band then underwent a small splitting (about 3 cm$^{-1}$) at about 1.94-1.99 V. At this point, the stage number (n) was calculated to be about 2.5. Shortly afterwards (at about 2.03 V) the $E_{2g(i)}$ band disappeared. This was followed by the $E_{2g(b)}$ roughly doubling in intensity before it underwent another large splitting (about 1619-1632 cm$^{-1}$) at the beginning of the upper plateau (about 2.097 V) (FIG. 10C). At the fully charged state, just one high intensity peak at about 1632 cm$^{-1}$ remained, indicating the formation of a stage 1 or 2 GIC since neither $E_{2g(i)}$ and $E_{2g(b)}$ bands were present (FIG. 10B). A stage 2 GIC was assumed, based on the capacity of the Al battery.

Figure 10D:
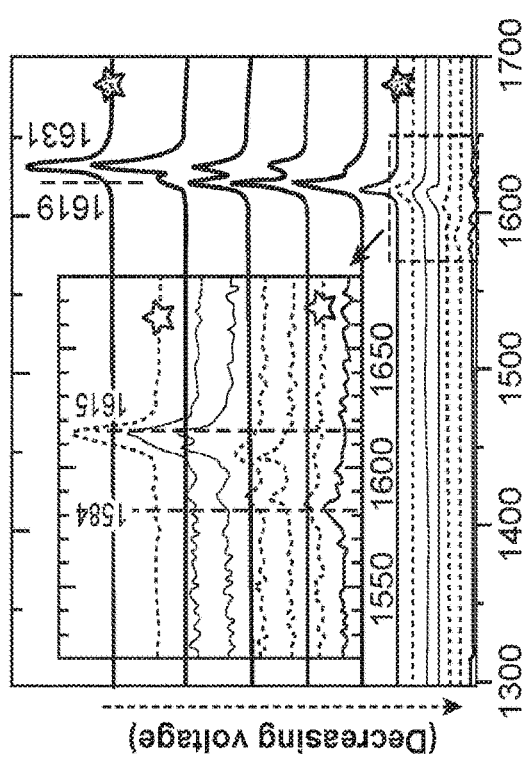

The subsequent discharge process was reflective of the charge process, demonstrating reversibility. As the discharge of the upper plateau began (about 2.011 V), there was a slight red shift by about 1 cm$^{-1}$. This band then split (about 12 cm$^{-1}$) halfway through the upper plateau (about 1.97 V), with another peak reappearing at about 1619 cm$^{-1}$ The about 1631 cm$^{-1}$ peak proceeded to disappear, and the about 1619 cm$^{-1}$ peak maximized at about 1.66 V, which signified the end of the upper plateau discharging process/deformation of the stage 2 GIC (see FIG. 10D). Half-way through the lower voltage plateau (about 1.535 V) the second large splitting occurred and the original $E_{2g(i)}$ began to reappear with decreasing potential (FIG. 10C inset). Shortly after the reappearance of the $E_{2g(i)}$ mode, another splitting occurred at about 1.525-1.535 V, small in magnitude (about 5 cm$^{-1}$), as was seen during the charging process (FIG. 10D). This splitting likely corresponded to one of the several lower current redox events in this region demonstrated by CV (FIG. 8A). Bands red-shifted during discharge.

Speciation in Electrolyte by Raman Spectroscopy.

Next, investigation is made of the speciation in several AlCl$_3$/urea electrolytes. In the AlCl$_3$/urea=about 1.0 ILA electrolyte, it was proposed that aluminum deposition occurred from a cationic species of the form [AlCl$_2$.(ligand)$_n$]$^+$, since Al$_2$Cl$_7^-$ was not present and AlCl$_4^-$ is not reduced in the relevant voltage window. Raman spectroscopy studies are performed for five electrolytes with AlCl$_3$/urea in the range of about 1.0-about 1.5 (FIG. 11A). Raman spectroscopy can be used to reveal the existence of chloroaluminate anions in both ILs and ILAs, with the Raman shifts appearing rather invariant in both ILs or ILAs with different cationic species. Observation is made of characteristic Raman shifts of AlCl$_4^-$ (about 311 cm$^{-1}$) and Al$_2$Cl$_7^-$ (about 347 cm$^{-1}$) for AlCl$_3$/urea >about 1.0 (FIG. 11A). For the AlCl$_3$/urea=about 1.0 electrolyte, just the about 347 cm$^{-1}$ peak (AlCl$_4^-$) was present, supporting the absence of Al$_2$Cl$_7^-$. When more AlCl$_3$ was added (increasing to about 1.1, about 1.3, about 1.4, and about 1.5 ratios), the peak at about 310 cm$^{-1}$ (Al$_2$Cl$_7^-$) systematically intensified relative to about 347 cm$^{-1}$, indicating the existence of Al$_2$Cl$_7^-$. Additionally, less intense modes of Al$_2$Cl$_7^-$ are observed that also increased with AlCl$_3$ content (FIG. 11B). Since Al$_2$Cl$_7^-$ exists in the AlCl$_3$/urea=about 1.3 electrolyte used for the Al battery, aluminum deposition likely occurs through two pathways:

Anode reaction: Al+7AlCl$_4^-$→4Al$_2$Cl$_7^-$+3$e^-$ (1)

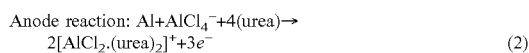

Anode reaction: Al+AlCl$_4^-$+4(urea)→
2[AlCl$_2$.(urea)$_2$]$^+$+3$e^-$ (2)

where deposition through a cationic species may likely be dominant (eq. 2). During aluminum deposition, cationic species can migrate to the aluminum electrode, while anionic species can migrate to the graphite electrode. Furthermore, Al deposition from the cation (via eq. 2) generates free urea at the surface of the aluminum electrode, which can react with some amount of Al$_2$Cl$_7^-$. Eq. 2 assumes that a four-coordinate cation exists, in which two urea molecules are bound to Al by the oxygen atom in urea. A tri-coordinate cation may be unlikely due to the lack of inductive substituents on the nitrogen that might allow it to be bidentate, as in the case of acetamide derivatives. The graphite intercalation reaction is given below:

Cathode reaction: C$_x^+$[AlCl$_4$]$^-$→AlCl$_4^-$+C$_x$–$e^-$ (3)

where x is the number of carbon atoms per intercalated anion (x=about 30 based on a capacity of about 75 mAh g$^{-1}$ from about 50 mA g$^{-1}$ galvanostatic discharging data). The specific energies calculated using Eq. (1) and Eq. (2) were about 45 Wh kg$^{-1}$ and about 76 Wh kg$^{-1}$, respectively. These values represent an upper limit to the specific energy, as the calculation neglects a fraction of neutral species that may accompany the anionic and cationic species in this liquid, which may not be 100% ionic.

Analyzing Relative Concentrations of Ionic Species in Electrolyte.

Analysis is made of the relative concentrations of ions in the electrolyte, namely [Al$_2$Cl$_7^-$]/[AlCl$_4^-$] and [AlCl$_2$.(urea)$_2$]$^+$/[Al$_2$Cl$_7^-$] using the ratio of the intensities of the Raman peaks of Al$_2$Cl$_7^-$ and AlCl$_4^-$ in the electrolyte (FIG. 11A). The ratio of the Raman scattering cross sections of Al$_2$Cl$_7^-$ and AlCl$_4^-$ anions derived for the 1-butyl-3-methylimidazolium chloride (BMIC)/AlCl$_3$ system was used to estimate [Al$_2$Cl$_7^-$]/[AlCl$_4^-$]=about 0.6 and [AlCl$_2$.(urea)$_2$]$^+$/[Al$_2$Cl$_7^-$]=about 2.6 (based on charge neutrality) in the AlCl$_3$/urea=about 1.3 electrolyte. This further indicates that for AlCl$_3$/urea=about 1.3 the aluminum deposition can be dominated by the cationic species, which is present at about 2.6 times the concentration of [Al$_2$Cl$_7^-$]. The upper limit of the specific energy of the real system based on just electrochemically active materials can therefore be closer to about 76 Wh kg$^{-1}$.

$^{27}$Al NMR spectroscopy was performed and identified Al species consistent with chloroaluminate anions and an urea-coordinated cation in the electrolytes (FIG. 11C, D). FIG. 11C, D compares $^{27}$Al NMR spectra of the AlCl$_3$-urea ILA to the AlCl$_3$-EMIC IL at the corresponding molar ratios. The spectrum of the AlCl$_3$/EMIC=about 1.0 electrolyte showed a single peak corresponding to AlCl$_4^-$ (δ=about 101.8 ppm) anion (FIG. 11C). However, the spectrum of AlCl$_3$/urea=about 1.0 electrolyte showed four resonances: about 52.7 ppm ([AlCl$_3$.(urea)$_2$]), about 71.8 ppm ([AlCl$_2$.(urea)$_2$]$^+$), about 88.0 ppm ([AlCl$_3$.(urea)]), and about 101.5 ppm (AlCl$_4^-$). The resonance at about 52.7 ppm was broad and of low intensity. In the AlCl$_3$/EMIC=about 1.3 electrolyte, the system is substantially fully ionic with AlCl$_4^-$ (δ=about 101.8 ppm) and Al$_2$Cl$_7^-$ (δ=about 96.7 ppm) being the dominant species at the about 1.3 ratio. In the AlCl$_3$/urea=about 1.3 electrolyte, the spectrum exhibited a much broader (likely due to chemical exchange) feature than the AlCl$_3$/EMIC=about 1.3, spanning the region corresponding to the anionic AlCl$_4^-$, Al$_2$Cl$_7^-$, and cationic species [AlCl$_2$.(urea)$_2$]$^+$, consistent with the existence of these ions in the electrolyte.

Conclusion:

A high efficiency battery that is stable over about 180 cycles and a variety of charge-discharge rates using an Al anode, graphite powder cathode, and inexpensive urea-AlCl$_3$ ionic liquid analogue electrolyte was successfully established. Intercalation/deintercalation of graphite during charging/discharging was confirmed by in-situ Raman experiments, and a stage 2 GIC was observed. Reversibility of the process was confirmed by recovery of the G-band at about 1584 cm$^{-1}$ with no increase of the D-band intensity observed. Raman spectroscopy and $^{27}$Al NMR of the electrolyte indicated the presence of AlCl$_4^-$, Al$_2$Cl$_7^-$, and [AlCl$_2$.(urea)$_n$]$^+$ ionic species in the electrolyte.

Example 4

Various graphite materials for Al-ion battery (AIB) cathodes are investigated, and it is determined that high quality natural graphite (NG) flakes, with very low Raman D band relative to the graphitic G band or low defect density, can be superior to synthetic graphite in conferring higher capacities and well-defined voltage plateaus. Two synthetic graphite materials (KS6 and MesoCarbon MicroBeads (MCMB)) were found to yield much lower capacity than NG without clear discharge voltage plateaus (FIG. 12). This was attributed to KS6 and MCMB materials with higher surface areas as having lower crystallinities and higher defect densities than NG (see Raman measurements in FIG. 12). These results indicated the suitability of high crystallinity, low defect density graphite materials for use in high performance Al-ion batteries; however, in general, it is found that graphite materials used for lithium-ion batteries tend to perform poorly in AIB.

FIG. 13 shows the rate performance of the Al/NG battery cell in EMIC/AlCl$_3$ electrolyte using a NG-based cathode. At higher charge-discharge rate or current densities, the cell showed increased capacity and higher coulombic efficiency. At a high rate of about 6 C (about 10 minutes charge/discharge time under about 660 mA g$^{-1}$ current), the Al/NG battery can still deliver a capacity of about 60 mAh g$^{-1}$ and about 99.5% coulombic efficiency. The discharge capacity recovered to about 110 mAh g$^{-1}$ when the rate slowed. Charge-discharge cycling at a high rate of about 6 C showed the high stability of the AIB without specific capacity decay over 6000 cycles at about 99.5% coulombic efficiency (FIG. 13c). Cycling at a lower rate (about 1.8 C, about 198 mA g$^{-1}$) also showed a high stability with a specific capacity of about 100 mAh g$^{-1}$ over 1100 cycles (see FIG. 13d), while the charge and discharge curves of the AIB battery recorded at the 3rd and 1100th cycle were substantially identical (inset of FIG. 13d).

The specific capacity of the Al/NG battery was significantly greater than that of a similar cell made with pyrolytic graphite (an increase to about 110 mAh g$^{-1}$ from about 66 mAh g$^{-1}$). The battery exhibited stable cycling behavior over >6000 charge-discharge cycles without noticeable decay and displayed a high discharge voltage plateau. The Al/NG battery produces an energy density of about 68.7 Wh kg-1 (based on about 110 mAh g$^{-1}$ cathode capacity and the masses of active materials in electrodes and electrolyte).

As used herein, the singular terms "a," "an," and "the" may include plural referents unless the context clearly dictates otherwise. Thus, for example, reference to an object may include multiple objects unless the context clearly dictates otherwise.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

The current collectors, polymer binders, separators, electrolyte purification and battery fabrication methods developed in this disclosure are generally applicable to aluminum-ion batteries in general for various types of ionic liquid electrolytes, including urea and EMIC based electrolytes.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While this disclosure has been described with reference to the specific embodiments thereof, it should be understood by those skilled in the art that various changes may be made and equivalents may be substituted without departing from the true spirit and scope of this disclosure as defined by the appended claims. In addition, many modifications may be made to adapt a particular situation, material, composition of matter, method, operation or operations, to the objective, spirit and scope of this disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of this disclosure. Accordingly, unless specifically indicated herein, the order and grouping of the operations are not a limitation of this disclosure.

What is claimed is:

1. A metal-ion battery comprising:
   an anode including a metal;
   a cathode; and
   an ionic liquid electrolyte disposed between the anode and the cathode, wherein the ionic liquid electrolyte comprises a mixture of AlCl$_3$ and urea,
   wherein a molar ratio of AlCl$_3$:urea in the mixture is in a range of about 1.1 to about 1.7.

2. The metal-ion battery of claim 1, wherein a battery operation temperature is about −30° C. to about 60° C.

3. The metal-ion battery of claim 1, wherein the cathode includes a hydrophilic polymer binder and a cathode active material blended with the hydrophilic polymer binder.

4. The metal-ion battery of claim 3, wherein the cathode active material is selected from graphite particles, natural graphite flakes, sulfur particles, selenium particles, black phosphorous particles, and black phosphorous films.

5. The metal-ion battery of claim 3, wherein the cathode active material includes natural graphite flakes having sizes in a range of about 20 μm to about 300 μm.

6. The metal-ion battery of claim 3, wherein the hydrophilic polymer binder includes one or more polymers selected from polyacrylic acid, polyvinyl alcohol, cellulose, cellulose derivatives, alginate, styrene-butadiene rubber, poly(3,4-ethylenedioxythiophene), and polystyrene sulfonate.

7. The metal-ion battery of claim 1, wherein the cathode includes a metal substrate as a current collector, and the metal substrate is optionally applied with a protective coating.

8. The metal-ion battery of claim 7, wherein the metal substrate is a nickel substrate, and the protective coating is a coating of a carbonaceous material, a conducting polymer, or tungsten.

9. The metal-ion battery of claim 7, wherein the metal substrate is a tungsten substrate.

10. The metal-ion battery of claim 1, wherein the cathode includes a fibrous, carbonaceous substrate as a current collector.

11. The metal-ion battery of claim 10, wherein the fibrous, carbonaceous substrate is carbon fiber paper, carbon fiber cloth, graphite fiber paper, or graphite fiber cloth.

12. A metal-ion battery comprising:
an anode including a metal;
a cathode; and
an ionic liquid electrolyte disposed between the anode and the cathode, wherein the ionic liquid electrolyte comprises a mixture of a metal halide and an organic compound,
wherein the cathode includes a hydrophilic polymer binder and a cathode active material blended with the hydrophilic polymer binder, and
wherein the cathode active material is selected from graphite particles, natural graphite flakes, sulfur particles, selenium particles, black phosphorous particles, and black phosphorous films.

13. The metal-ion battery of claim 12, wherein the metal is aluminum, and the metal halide is an aluminum halide.

14. The metal-ion battery of claim 13, wherein the aluminum halide is $AlCl_3$, and the organic compound is an amide.

15. The metal-ion battery of claim 13, wherein the aluminum halide is $AlCl_3$, and the organic compound incudes cations selected from N-(n-butyl) pyridinium, benzyltrimethylammonium, 1,2-dimethyl-3-propylimidazolium, trihexyltetradecylphosphonium, and 1-butyl-1-methyl-pyrrolidinium, and anions selected from tetrafluoroborate, trifluoromethanesulfonate, and bis(trifluoromethanesulfonyl) imide.

16. The metal-ion battery of claim 13, wherein the aluminum halide is $AlCl_3$, and the organic compound is selected from 4-propylpyridine, acetamide, trimethylphenylammonium chloride, and 1-ethyl-3-methylimidazolium chloride.

17. The metal-ion battery of claim 13, wherein the ionic liquid electrolyte includes an aluminum halide cation that is datively bonded to the organic compound.

18. The metal-ion battery of claim 12, wherein the cathode includes a metal substrate as a current collector, and the metal substrate is optionally applied with a protective coating.

19. The metal-ion battery of claim 18, wherein the metal substrate is a nickel substrate, and the protective coating is a coating of a carbonaceous material, a conducting polymer, or tungsten.

20. The metal-ion battery of claim 18, wherein the metal substrate is a tungsten substrate.

21. The metal-ion battery of claim 12, wherein the cathode includes a fibrous, carbonaceous substrate as a current collector.

22. The metal-ion battery of claim 21, wherein the fibrous, carbonaceous substrate is carbon fiber paper, carbon fiber cloth, graphite fiber paper, or graphite fiber cloth.

* * * * *